US008729880B2

(12) United States Patent
McCloy-Stevens et al.

(10) Patent No.: US 8,729,880 B2
(45) Date of Patent: May 20, 2014

(54) SWITCHED POWER REGULATOR WITH ERROR SIGNAL ESTIMATION AND PRESETTING

(75) Inventors: Mark McCloy-Stevens, Edinburgh (GB); Andrew Notman, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 381 days.

(21) Appl. No.: 12/841,604

(22) Filed: Jul. 22, 2010

(65) Prior Publication Data
US 2011/0018507 A1 Jan. 27, 2011

Related U.S. Application Data

(60) Provisional application No. 61/228,002, filed on Jul. 23, 2009, provisional application No. 61/261,128, filed on Nov. 13, 2009.

(30) Foreign Application Priority Data

Jul. 22, 2009 (GB) .................................. 0912745.7
Oct. 27, 2009 (GB) .................................. 0918791.5

(51) Int. Cl.
*H02M 3/156* (2006.01)
(52) U.S. Cl.
USPC .......................................... 323/285; 323/282
(58) Field of Classification Search
USPC ........................... 323/282, 283, 285, 286, 299
See application file for complete search history.

(56) References Cited

U.S. PATENT DOCUMENTS

| 5,089,768 | A  | * | 2/1992 | Sato .............................. 323/318 |
| 5,399,914 | A  | * | 3/1995 | Brewster ...................... 327/538 |
| 6,166,528 | A  | * | 12/2000 | Rossetti et al. .............. 323/283 |
| 6,377,032 | B1 |   | 4/2002 | Andruzzi et al. |
| 7,030,596 | B1 | * | 4/2006 | Salerno et al. ................ 323/282 |
| 7,250,746 | B2 | * | 7/2007 | Oswald et al. ................ 323/284 |
| 7,372,238 | B1 |   | 5/2008 | Tomiyoshi |
| 2006/0250120 | A1 | * | 11/2006 | King ............................. 323/283 |
| 2006/0255787 | A1 | * | 11/2006 | Schaffer et al. ............... 323/315 |

(Continued)

FOREIGN PATENT DOCUMENTS

| EP | 1 587 208 A1 | 10/2005 |
| EP | 2 028 752 A1 | 2/2009 |
| WO | WO 2007/024675 A1 | 3/2007 |

OTHER PUBLICATIONS

English-language abstract of article by Chen Fuji et al., "Design and implementation of an adaptive slope compensation circuit", Chinese Journal of Semiconductors, Mar. 2008, pp. 593-597, vol. 29.

*Primary Examiner* — Adolf Berhane
*Assistant Examiner* — Fred E Finch, III
(74) *Attorney, Agent, or Firm* — Dickstein Shapiro LLP

(57) ABSTRACT

A regulator circuit comprising an input for receiving an input voltage; an output stage, configured to switch between said input voltage and a reference voltage to generate an output voltage, in dependence on a modulated signal; a controller, configured to receive an error signal ($V_{ERROR}$) on a control input and to provide the modulated signal to said output stage; an error amplifier, for providing the error signal to the controller in dependence on the output voltage; and presetting circuitry, configured to estimate the error signal in dependence on at least the input voltage, and for presetting the control input with the estimated error signal.

30 Claims, 18 Drawing Sheets

(56) References Cited

U.S. PATENT DOCUMENTS

| | | | |
|---|---|---|---|
| 2006/0261794 A1* | 11/2006 | May | 323/283 |
| 2006/0284607 A1* | 12/2006 | Isobe | 323/282 |
| 2007/0046273 A1* | 3/2007 | Riehl | 323/282 |
| 2007/0253229 A1* | 11/2007 | Dowlatabadi | 363/49 |
| 2007/0296389 A1 | 12/2007 | Chen et al. | |
| 2008/0186006 A1* | 8/2008 | Chapuis | 323/283 |
| 2008/0191677 A1* | 8/2008 | Bacchi et al. | 323/282 |
| 2008/0218142 A1 | 9/2008 | Uehara | |
| 2008/0303493 A1* | 12/2008 | Hu et al. | 323/271 |
| 2009/0027028 A1* | 1/2009 | Ting | 323/288 |
| 2009/0128116 A1* | 5/2009 | Noda | 323/290 |
| 2009/0262556 A1* | 10/2009 | Tomiyoshi et al. | 363/17 |

* cited by examiner

SWITCHED POWER REGULATOR WITH ERROR SIGNAL ESTIMATION AND PRESETTING

This application claims the benefit of U.S. Provisional Application No. 61/228,002, filed Jul. 23, 2009, and U.S. Provisional Application No. 61/261,128, filed Nov. 13, 2009.

BACKGROUND OF THE INVENTION

1. Field of the Invention

The present invention relates to power regulators having a control node for an error signal, and in particular to methods and apparatus for estimating the error signal and charging the control node accordingly.

2. Description of the Related Art

In electronic equipment in general, and particularly for fast-moving segments such as portable consumer devices (e.g. mobile phones, MP3 players etc), there is a relentless push to use the latest processor technology to increase the device capability and feature set while reducing power and cost. As the next generation of processors becomes available, lower operating voltages are used than in previous-generation processors so as to allow a reduction in process feature size, i.e. W/L, that enables a greater level of integration. This is beneficial in terms of reduced die size, reduced die cost and reduced power consumption.

Such progress results in two design challenges for power supply circuitry (e.g. DC-DC converters) to service these processors: one induced by the choice of the value of the low voltage; the other by battery technology lagging behind the change to lower processor supply voltages.

(i) The reduction in processor supply voltage requires a much tighter control—in absolute terms—of the DC-DC converter output voltage under prevailing processor load and battery conditions. If the control over the processor supply voltage is not sufficient, problems with under- or overvoltage may occur; both are equally undesirable.

(ii) Since the battery terminal voltage has not dropped appreciably, and the duty cycle of a DC-DC converter is given by the ratio of $V_{OUT}/V_{IN}$, duty cycles must therefore reduce. This, coupled with the desire for small external components, pushes the DC-DC converter to high operating frequencies, resulting in extremely short switch on i.e. conduction, times. The increase in switching speed afforded by the reduction in transistor feature size is not normally available for the power switches since the interface components must be rated to battery voltage.

Since small conduction periods i.e. on times, of the power switches are difficult to control, a more robust method needs to be found in order to control the lower processor output voltages with adequate accuracy. Fortunately, one such method exists: Valley Current Mode (VCM). This method of DC-DC loop control controls the input transistor off i.e. non-conduction, time, rather than the on time. For the low duty cycle required, the non-conduction time is longer than the conduction time, so is therefore easier to control. Also VCM DC-DC converters are known to offer an inherently higher bandwidth and an improved transient response.

Consider a buck converter, with an inductor switched between a supply $V_{IN}$ and Ground by a PMOS transistor and an NMOS transistor respectively. Under high or medium current demand, the inductor current, composed of an average component and a ripple, remains above zero through every cycle. This is termed Continuous Conduction Mode (CCM). As the load current demand decreases, it is advantageous for efficiency reasons to alter the control so that the current in the inductor goes to zero for some of each cycle to avoid ripple being large enough to cause a reverse in the current in the inductor. This is termed Discontinuous Current Mode (DCM). At even lower load currents it is advantageous to "pulse-skip" so the PMOS switch does not recharge the inductor in some cycles, but this can lead to undesired behaviour.

These various modes present different control problems and dynamics, and it is important to be able to transition between modes seamlessly without transients appearing during change over. There is also the opportunity for other modes, where current is saved by using simpler control schemes adequate for lower currents, such as unclocked hysteretic modes. For low currents, it may even be advantageous to use a linear regulator such as an LDO (Low Drop Out) regulator rather than a switched voltage regulator. For optimum performance the open-loop transfer function has to be tightly toleranced, and internal signal swings maximized.

FIG. 1 shows a typical application where processor circuitry 101, which may, for example, be a processor of a portable electronic device, is supplied with a voltage $V_{OUT}$ (102) by a DC-DC converter 100. The DC-DC converter 100 receives an input voltage $V_{IN}$ (103) and an external clock signal CLK (104) and outputs the required voltage output $V_{OUT}$ (102). It is usual for the supply voltage of a processor to be reduced when it is idling in order to save power, and then to ramp up to a more normal operating voltage where it may achieve full operating speed. The processor circuitry 101 therefore provides voltage select signals $V_{SEL}$ (105) to the DC-DC converter 100 to select an appropriate voltage output $V_{OUT}$. The voltage select signals may be digital signals for controlling a programmable element of the DC-DC converter, such as a level shifter, as will be described later. The DC-DC converter 100 may also be operable in various modes, as will be described later, and the processor circuitry may select a particular mode of operation by appropriate mode control signals MODE (106). It will be appreciated that DC-DC converters may be used to provide power to device subsystems other than processors and the embodiments described herein are generally applicable to any DC-DC converter or switched voltage regulator used for any application.

A conventional current-mode buck (i.e. step down) DC-DC converter 200 is shown in simplified form in FIG. 2. The converter 200 comprises two nested feedback loops: an inner Current Control loop and an outer Voltage Control loop.

The Current Control loop block 201 takes an input signal $V_{ERROR}$ and a current sense signal ISNS fed back from the output stage and generates pulse-width modulated drive signals for the output stage 202. The voltage on the output stage output node LX is switched between ground and supply, $V_{IN}$, at a controlled duty cycle, resulting in a triangular current waveform in the inductor L. The inductor L and output capacitor C1 act as a filter to reduce voltage ripple superimposed on the average voltage of $V_{OUT}$ at an output node 203.

In operation the inductor current is sensed, and compared with $V_{ERROR}$. So this feedback loop generates an output sensed current varying according to the input signal $V_{ERROR}$. In many conventional DC-DC converters the sensed current is a peak current, although it is known to use an average current in some converters. In embodiments of the present invention to be described the minimum or "valley" current is used to control the duty cycle of the converter.

Variation of the delivered output current, smoothed by the output filter L, C1, modulates the output voltage at $V_{OUT}$. This voltage $V_{OUT}$ is fed back, translated down to an appropriate voltage $V_{OUT\_LS}$ by a Level Shifter, or Voltage Shifter, block 204, to the input of a Voltage Error Amplifier block 205. The Voltage Error Amplifier block 205 compares this processed version of $V_{OUT}$ with a supplied reference voltage $V_{REF}$ and provides the error signal $V_{ERROR}$ which drives the above described inner feedback loop to close the outer feedback loop and thus stabilize $V_{OUT}$ at the desired voltage.

The Level Shifter 204 is illustrated as a resistive potential divider. The level shifter applies a conversion to the level of $V_{OUT}$ such that, when $V_{OUT}$ is equal to the desired or target output voltage, the level shifted signal $V_{OUT\_LS}$ has a known relationship to the reference voltage $V_{REF}$ (e.g. the level shifted signal $V_{OUT\_LS}$ may be equal to $V_{REF}$ when $V_{OUT}$ is exactly the desired output voltage). The Level Shifter 204 may be programmable, mechanically or digitally, to provide different voltage scaling or shifting circuitry, so as to allow the converter to be configurable to output different values of $V_{OUT}$. For instance, it may be programmable by a digital multi-bit signal, such as the $V_{SEL}$ signal generated by a processor as shown in FIG. 1.

The Voltage Error Amplifier 205 is illustrated as an Operational Transconductance Amplifier (OTA) 206 driving an RC network 207, but could be some other amplifier. Generally it may include some passive impedances, such as this RC network, to provide closed-loop stabilization.

The Current Loop Control block 201 receives a signal 208 from the output stage 202 which passes through a Current Sensor Amp block 209 to pre-condition it, for instance to scale or strobe the signal, representative of the inductor current, to generate a convenient current sense signal ISNS. A Ramp Generator 213 may generate a slope compensation ramp signal ISLP which may be added either in whole or in part to the ISNS signal to generate a summed signal VISUM, so as to prevent sub-harmonic oscillations as would be well understood by one skilled in the art. A duty modulator 210 compares the VISUM signal to the input $V_{ERROR}$ to derive drive signals of the appropriate duty cycle to drive the output stage devices (10, 20) on and off via a Switch Driver buffer stage 211. The Duty Modulator 210 may require a clock signal 212 to generate the necessary sequence of pulses as would be understood by one skilled in the art.

The Output Stage 202 in general will have a high-side driver device such as a PMOS transistor 10 to switch the output to the high-side supply rail 214 ($V_{IN}$) and a low-side driver device such as an NMOS transistor 20 to switch the output to the low-side supply rail 215 (Ground). The Stage 202 is also required to supply information, i.e. an indication, of inductor current signal 208, to feed back to the Current Control block 201.

The DC-DC converter 200 of FIG. 2 requires a voltage shifter, e.g. a potential divider, to translate the output voltage $V_{OUT}$ down to a (nominally) convenient reference voltage. Also this is a convenient place to adjust or trim the converter output voltage $V_{OUT}$ by use of a programmable voltage shifter.

As described above, the Duty Modulator 210 compares the $V_{ERROR}$ signal with a signal VISUM that is a sum of a signal ISNS representative of the current in the inductor L, plus a ramping signal designed to prevent sub-harmonic oscillations. In an alternative arrangement (not illustrated), the ramping signal may be subtracted from the $V_{ERROR}$ signal to provide the same effect.

FIG. 3 is a graph illustrating the various waveforms in the Duty Modulator 210 over one cycle of the DC-DC converter 200 operating in Valley Current Mode (VCM). $V_{ERROR}$ is shown by a dashed line 310; VISUM is shown on the same plot by a solid line 320; a clock signal is shown as line 330; and the resultant pulse-width modulated (PWM) signal is shown as line 340.

The bandwidth of the outer Voltage Control loop is considerably lower than that of the inner Current Control loop, and therefore the feedback signal $V_{ERROR}$ 310 may be considered to be constant across a single cycle.

As the clock signal 330 is asserted, the PWM signal 340 goes low, causing the NMOS 20 to switch on, and the PMOS 10 to switch off. The current in the inductor therefore decreases, and VISUM 320 also decreases. When VISUM 320 becomes equal to $V_{ERROR}$ 310, the PWM signal 340 goes high, causing the NMOS 20 to switch off, and the PMOS 10 to switch on. The current in the inductor therefore increases, and VISUM 320 also increases. (In some implementations, VISUM may no longer be generated after the decision point is reached, as it is not used in this part of the cycle.)

It can therefore be seen that the switching of the PMOS 10 and NMOS 20 devices depends on the level of the feedback signal $V_{ERROR}$, and in particular on the point at which $V_{ERROR}$ intersects with VISUM.

In order to save power during low power modes, it is possible to turn off most of the inessential analogue circuitry. In some arrangements the outer Voltage Control feedback loop may be disabled. That is, the Operational Transconductance Amplifier (OTA) block 206, the current sensor amplifier 209, the slope compensation ramp generation block 213 and the duty modulator block 210 may all be powered down, or otherwise disconnected and/or made inactive to render the error amplifier non-operational, i.e. no longer supplying a $V_{ERROR}$ responsive to the amplifier inputs. This may also occur in modes where a fault has been detected in the system to which the converter 200 is connected, or in the converter 200 itself. In such fault condition modes, the blocks mentioned above may be similarly powered down, disconnected or made inactive.

This leaves the problem of how to transition from one of these modes, where the feedback loop is inactive (e.g. a start-up mode), to a normal mode of operation (e.g. CCM) where the feedback loop is operational, as the value of $V_{ERROR}$ will initially be poorly defined. For example, if the $V_{ERROR}$ signal is initially high, the PMOS 10 may be instantly switched on and remain on for an entire cycle; if the $V_{ERROR}$ signal is initially low, the PMOS 10 may not switch on at all in the first cycle. These situations are likely to lead to overshoot and undershoot of the output voltage VOUT, respectively. Although such errors will be corrected in time as $V_{ERROR}$ moves to its correct value, this correction may occur only after an unacceptable number of cycles. In other words, a poorly defined value of $V_{ERROR}$ when first powering on the control loop (for example on a transition between modes) leads to a loss of control in the output voltage: the resulting output voltage undershoot or overshot may cause mis-operation of, or even damage to, downstream circuitry

SUMMARY OF THE INVENTION

It is therefore an object of the present invention to overcome these drawbacks when changing from a first mode with a powered-down error amplifier to a second mode with an operational error amplifier.

According to a first aspect of the present invention there is provided a regulator circuit. The regulator circuit comprises an input, an output stage, a controller, an error amplifier and presetting circuitry. The input receives an input voltage. The output stage is configured to switch between the input voltage and a reference voltage to generate an output voltage, in dependence on a modulated signal. The controller is configured to receive an error signal on a control input and to provide the modulated signal to the output stage. The error amplifier provides the error signal to the controller in dependence on the output voltage. The presetting circuitry is configured to estimate the error signal in dependence on at least the input voltage, presets the control input with the estimated error signal.

In a second aspect, there is provided a method of operating a regulator circuit. The method comprises the steps of: generating a modulated signal in dependence on an error signal received at a control input; in dependence on said modulated signal, switching between an input voltage and a reference voltage to generate an output voltage; in a first mode, providing said error signal to said control input in dependence on said output voltage; and in a second mode, estimating said error signal in dependence on at least said input voltage, and presetting said control input with said estimated error signal.

In summary, therefore, the problem of transients during DC-DC converter switching from a mode where the main loop is inactive (including start-up) to a mode where the main loop is active is solved by precharging, when the main loop is inactive, the dominant compensation capacitor to the steady-state voltage expected when the main loop re-activates. In an embodiment of a buck converter operating in valley control mode, the steady-state voltage is proportional to $(V_{IN}-V_{OUT})^2/V_{IN}$. In one embodiment, the capacitor may be charged using a translinear circuit. In a further embodiment, the precharging may be applied to the junction of the capacitor and a resistor.

In another aspect of the invention therefore an apparatus operable as a DC-DC converter having feedback circuitry for providing a voltage feedback signal comprises circuitry for pre-charging a capacitor connected to the feedback loop. The capacitor is charged to a level similar to the output of an error amplifier of the feedback circuitry in operation, preferably a start-up mode of operation.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 4:
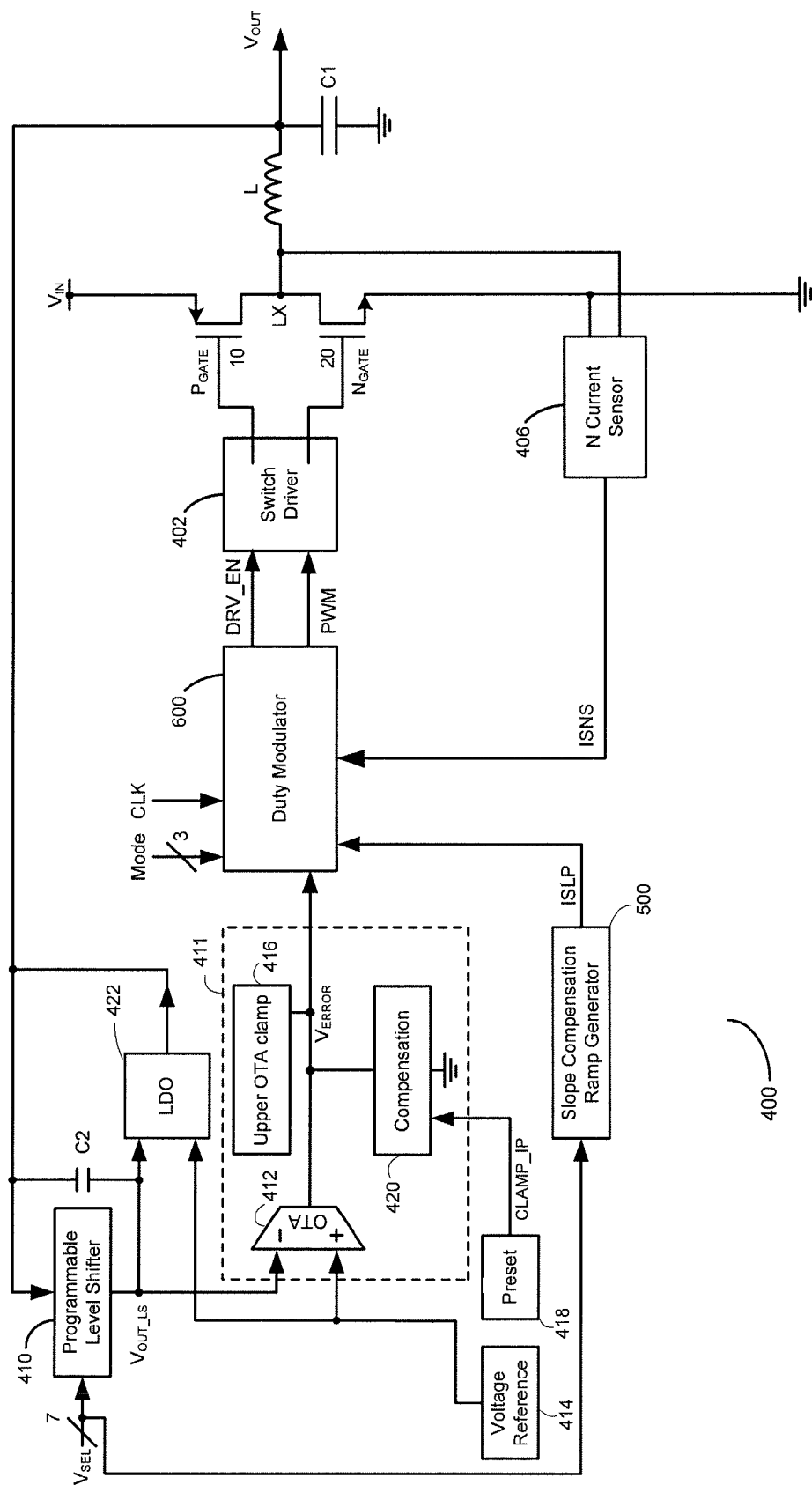
FIG. 4 shows a DC-DC converter according to an embodiment the present invention.

FIG. 4 illustrates a DC-DC converter circuit 400 according to the present invention. Although illustrated and described herein in the context of DC-DC converters, the skilled person will recognize that the present invention may be equally applicable to many switched power regulators having a control node for an error signal.

Figure 2:
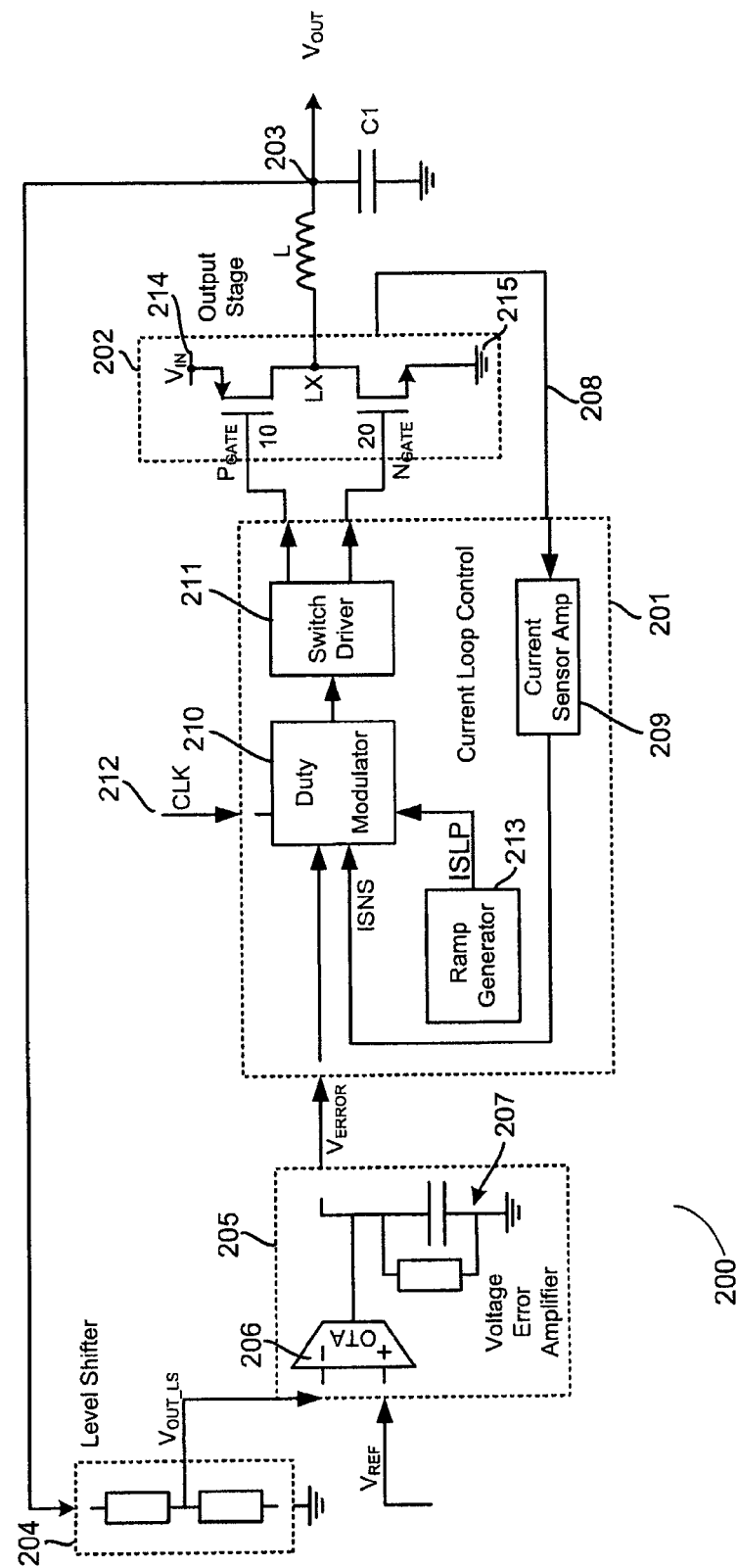
FIG. 2 shows a DC-DC converter.

The regulator circuit 400 is similar in many respects to the circuit 200 described with respect to FIG. 2.

The regulator 400 comprises an output stage having an input for receiving an input voltage $V_{IN}$, an output node LX, and a reference voltage which in the illustrated example is ground. The output node LX is connected to the input voltage $V_{IN}$ via a high-side switching device (e.g. a PMOS transistor) 10, and to ground via a low-side switching device (e.g. an NMOS transistor) 20. The voltage on the output stage output node LX is switched between ground and supply, $V_{IN}$, at a controlled duty cycle, resulting in a triangular current waveform in the inductor L. The inductor L and output capacitor C1 act as a filter to ensure an average voltage $V_{OUT}$ at an output node.

The PMOS and NMOS switches 10, 20 are opened and closed by the action of a switch driver block 402, and the switch driver block 402 is in turn controlled by the action of a controller circuit, or duty modulator 600. An enable signal DRV_EN is provided to the switch driver block 402 to enable the block 402, and a pulse-width modulated signal PWM provided to the switch driver block 402 to control the operation of the switches 10, 20. For example, in one embodiment when the PWM signal goes low, the NMOS switch 20 is closed and the PMOS switch is opened; when the PWM signal goes high, the PMOS switch 10 is closed and the NMOS switch 20 is opened, although alternative arrangements will be apparent to those skilled in the art.

Two nested feedback loops, an inner Current Control loop and an outer Voltage Control loop both meeting in the duty modulator 600, control the PWM signal and therefore the output voltage $V_{OUT}$ and the output current.

In the current control loop, a current sensor circuit 406 senses the current in the inductor L, and provides a signal ISNS representative of that current to the duty modulator 600. In one embodiment the inductor current is sensed with a resistor coupled in series with the inductor or one of the switches 10, 20. However, this introduces an extra source of resistive power loss, so it is preferable to use "lossless" sensing techniques, for example to sense the drain-source voltage across the PMOS 10 (or NMOS 20 as illustrated) due to its on resistance. This drain-source voltage is proportional to the PMOS (or NMOS) current, and may be suitably scaled and/or sampled or otherwise processed to give a convenient signal ISNS representative of the inductor current.

The Current Control loop takes an input signal $V_{ERROR}$ and the current sense signal ISNS fed back from the output stage and generates the PWM signal for the switch driver block 402.

In operation the inductor current is sensed, and used to compare with $V_{ERROR}$. So this feedback loop generates an output sensed current varying according to the input signal $V_{ERROR}$. The sensed current may be a peak current, or an average current. In the illustrated embodiments of the present invention, however, the minimum or "valley" current is used to control the duty cycle of the regulator circuit 400.

Variation of the delivered output current, smoothed by the output filter L, C1, modulates the output voltage at $V_{OUT}$. This voltage $V_{OUT}$ is fed back, translated down to an appropriate voltage $V_{OUT\_LS}$ by a Level Shifter, or Voltage Shifter, block 410, to the input of a Voltage Error Amplifier block 411. A capacitor C2 is connected in parallel with the level shifter block 410 to provide a high-frequency bypass path in order to maintain a frequency-flat gain response across the level shifter, to avoid introducing an extra pole that might degrade feedback loop stability.

The Voltage Error Amplifier block 411, in the illustrated embodiment, comprises an operational transconductance amplifier (OTA) 412, an upper OTA clamp 416, and a compensation block 420. The OTA 412 compares this processed version of $V_{OUT}$ with a reference voltage $V_{REF}$ supplied by a block 414, and provides the error signal $V_{ERROR}$ which drives the above described inner feedback loop to close the outer feedback loop and thus stabilize $V_{OUT}$ at the desired voltage. $V_{ERROR}$ is prevented from going excessively high during transients by the Upper OTA Clamp 416 that clamps the signal if it exceeds a threshold value but otherwise lets the signal pass through unaltered.

Figure 1:
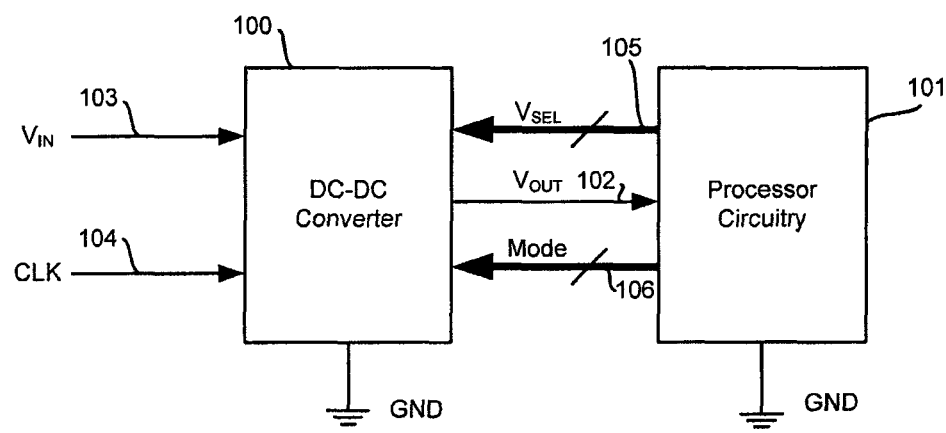
FIG. 1 is a schematic drawing showing the operation of a DC-DC converter coupled to processing circuitry.

The Level Shifter 410 may be a resistive potential divider, or any similar circuit that shifts the output voltage $V_{OUT}$ by a known amount, or by a known factor, to generate $V_{OUT\_LS}$. The level shifter applies a conversion to the level of $V_{OUT}$ such that, when $V_{OUT}$ is equal to the desired or target output voltage, the level shifted signal $V_{OUT\_LS}$ has a known relationship to the reference voltage $V_{REF}$ (e.g. the level shifted signal $V_{OUT\_LS}$ may be equal to $V_{REF}$ when $V_{OUT}$ is exactly the desired output voltage). The Level Shifter 410 may be programmable, mechanically and/or digitally, to provide different voltage scaling or shifting circuitry, so as to allow the converter to be configurable to output different values of $V_{OUT}$. For instance, it may be programmable by a digital multi-bit signal, such as the $V_{SEL}$ signal generated by a processor as shown in FIG. 1.

The Voltage Error Amplifier 411 is illustrated as comprising an OTA 412, but could be some other amplifier. Its output current drives into the compensation block 420, generally comprising some passive impedances, to develop the error voltage $V_{ERROR}$ (this voltage possibly clamped during gross transients by Upper OTA Clamp 416). The compensation block 420 is described in greater detail with respect to FIG. 5. The poles and zeros introduced by these passive impedances are designed to provide adequate closed-loop stabilization.

Figure 3:
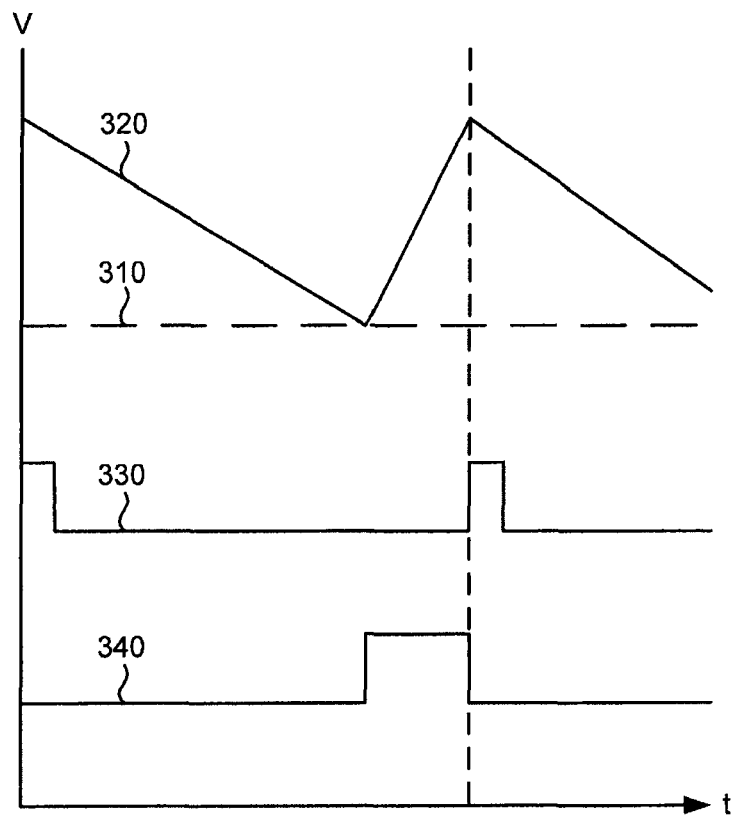
FIG. 3 shows waveforms for a DC-DC converter operating in valley control mode.

The regulator circuit 400 further comprises a slope compensation ramp generator 500, that provides a current ramp, or sawtooth, signal ISLP to the duty modulator 600 designed to prevent sub-harmonic oscillations in the output current. That is, ISLP ramps every cycle with a current slope, or gradient that may be predetermined or dependent on input and output voltages. The slope of ISLP may also be programmable by a digital multi-bit signal, such as the $V_{SEL}$ signal generated by a processor as shown in FIG. 1. As shown with respect to FIG. 3, the Duty Modulator 600 compares the $V_{ERROR}$ signal with a signal VISUM that is a sum of a signal ISNS representative of the current in the inductor L, plus the ramping signal ISLP. In an alternative arrangement (not illustrated), the ramping signal may be subtracted from the $V_{ERROR}$ signal to provide the same effect.

The regulator circuit 400 thus described is therefore similar to the conventional circuit 200 described with respect to FIG. 2. As mentioned above, in order to save power during low power modes, or when in any other mode such as a fault condition mode, it is possible to turn off some or all of the inessential analogue circuitry. In some arrangements the outer Voltage Control feedback loop may be disabled. That is, the OTA block 412, the slope compensation ramp generation block 500 and the duty modulator block 600 may all be powered down, disconnected, or in general become inactive.

For example, in the illustrated embodiment the regulator circuit 400 comprises a low drop out regulator block (LDO) 422 that is coupled to receive the level-shifted output voltage $V_{OUT\_LS}$ from the level-shift block 410, and the reference voltage $V_{REF}$ from the voltage reference block 414. The output of the LDO 422 is coupled to provide the input to the level-shift block 410 and the output $V_{OUT}$ of the regulator circuit 400.

Thus, in one mode of operation (referred to hereinafter as "LDO mode"), the regulator circuit 400 acts as an LDO regulator with all other circuitry (i.e. the OTA 412, the duty modulator 600, switch driver 402, etc) being powered down. In LDO mode, therefore, $V_{ERROR}$ is not well defined.

The regulator circuit 400 may also have other modes of operation in which the outer voltage control loop is not operational. For example, on start up, the OTA 412 may not be switched on and therefore the value of $V_{ERROR}$ would not be well defined. The present invention is applicable to all such modes.

The error amplifier 411 may be rendered non-operational by powering it down or by configuring its output high-impedance in some other way, for instance by opening a switch in series with the output of its constituent OTA 412.

As previously mentioned, these modes of operation result in a temporary lack of control in the output voltage $V_{OUT}$ when switching to a mode in which the outer voltage control loop is operational, due to the poorly defined value of $V_{ERROR}$. To overcome this problem, the regulator circuit 400 according to embodiments of the present invention precharges the control node corresponding to the output of the voltage error amplifier to a determined value of $V_{ERROR}$. The regulator circuit 400 may comprise circuitry that estimates the pre-charged value of $V_{ERROR}$ or calculates it exactly, developing a corresponding voltage according to methods such as described in more detail below. In this way, the output of the voltage feedback loop is set at, or close to, its correct value for stable operation of the regulator circuit 400 and transients in the output voltage $V_{OUT}$ caused by a change of operational mode are reduced or removed completely.

The regulator circuit 400 according to embodiments of the present invention comprises a preset block 418 and a compensation block 420. The preset block 418 provides a voltage CLAMP_IP to the compensation block 420, which in turn is coupled to the output of the OTA 412 and the Upper OTA clamp 416.

Figure 5:
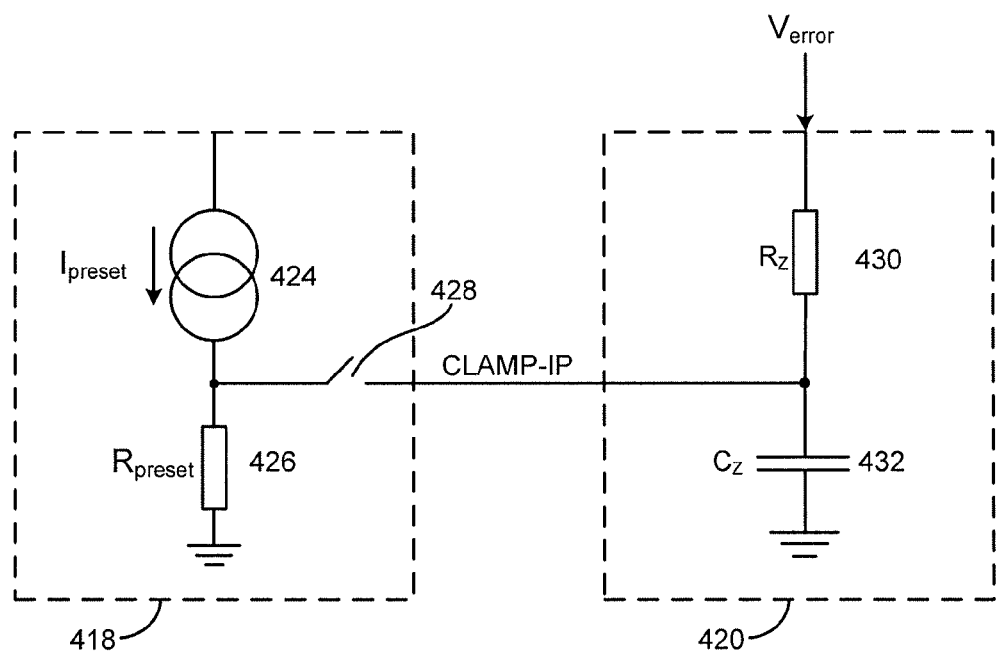
FIG. 5 shows preset and compensation circuitry according to one embodiment of the present invention.

FIG. 5 shows the preset and compensation blocks 418, 420 according to one embodiment of the present invention. Those skilled in the art will be able to derive alternative arrangements without inventive skill, and without departing from the scope of the present invention, however. For example, a buffer or a clamp may be used in conjunction with a current source to drive the voltage at the control node of the duty modulator to an appropriate value of $V_{ERROR}$.

The preset block 418 of this illustrated embodiment comprises a current source 424 connected in series with a resistor 426. The opposite terminal of the resistor 426 is connected to a reference voltage, which in the illustrated embodiment is ground. The current source 424 provides a current $I_{preset}$, and the resistor 426 has a resistance of $R_{preset}$.

The compensation block 420 is coupled to the output of the OTA 412, whose output current develops the voltage $V_{ERROR}$ across the impedance of this block, in this case comprising a resistor 430 connected in series to a capacitor 432. The capacitor 432 has a capacitance of $C_Z$, and the resistor 430 has a resistance of $R_Z$. The opposite terminal of the capacitor 432 is connected to a reference voltage, which in the illustrated embodiment is ground. A node between the current source 424 and the resistor 426 of the preset block 418 is coupled to a node between the resistor 430 and the capacitor 432 of the compensation block 420 via a switch 428.

In normal operation of the regulator circuit 400, the OTA 412 drives an output current into the compensation block 420 that develops a voltage $V_{ERROR}$ on a control input to the Duty Modulator 600. This current drives the series combination of $R_Z$ and $C_Z$ to provide a pole and zero to stabilize the voltage control loop. Parasitic capacitance on the $V_{ERROR}$ control node generates another pole, but this is undesirable so capacitance on this node is preferably to be minimized, so as to keep this pole above the unity gain bandwidth of the loop to avoid impacting stability.

In normal operation, switch 428 is open so preset block 418 has no effect. When the voltage error loop is inactive, the switch 428 is closed connecting the compensation capacitor 432 to the voltage defined by $I_{preset}$ and $R_{preset}$. The OTA block 412 that supplies $V_{ERROR}$ is off, and its output is high impedance so there is no current flowing through $R_Z$ 430 and the voltage reached across $C_Z$ is simply $I_{preset}*R_{preset}$. Switch 428 could be connected directly to the $V_{ERROR}$ control node, but in the illustrated embodiment the switch 428 is connected to the junction of $R_Z$ 430 and $C_Z$ 432 rather than to the $V_{ERROR}$ control node in order to avoid parasitic capacitance loading on this sensitive node due to the switch parasitics. Since $C_Z$ is of the order of tens of picofarads, the switch parasitics have little effect on the $C_Z$ node.

The current $I_{preset}$ provided by the current source 424 is therefore set to provide a voltage across the capacitor 432 that is at least an approximation of the quiescent value of $V_{ERROR}$ in normal operation (that is, the current is derived based on an equation that is an approximation); in one embodiment, the voltage may be set equal to the quiescent value of $V_{ERROR}$ (that is, the current is derived based on an equation that is an accurate representation of the quiescent value of $V_{ERROR}$). The derivation of the value of $I_{preset}$ is given in greater detail below.

In this embodiment, the switch 428 is closed when the voltage control loop is inactive (i.e. at least the OTA 412 is disabled); therefore, when the voltage control loop is activated, its output is already preset to the correct value of $V_{ERROR}$, at least to an approximation. In other embodiments, the switch 428 may be closed as part of a sequence in transitioning from a mode with an inactive voltage control loop to a mode with an active control loop. That is, the switch 428 may not be closed whenever the voltage control loop is inactive, but only closed as part of a sequence in moving from an inactive control loop to an active control loop. Such control of the mode may be provided, for example, by a mode control signal from a processor, as described with respect to FIG. 1.

Figure 6:
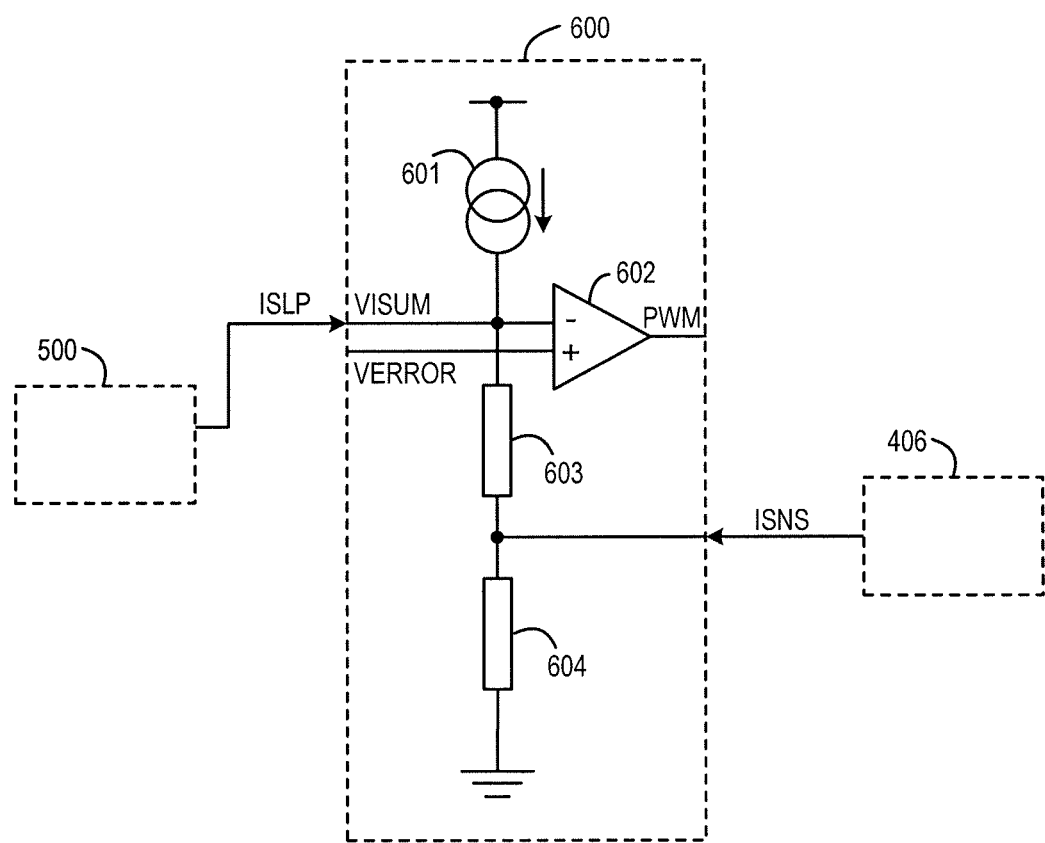
FIG. 6 shows a duty modulator according to an embodiment of the present invention.

FIG. 6 shows in more detail the duty modulator 600 according to an embodiment of the present invention, and its connection to the current sensor 406 and the slope compensation ramp generator 500. Those skilled in the art will appreciate that the drawing is greatly simplified for the purposes of clarity, and many components have been simplified or omitted where possible without adversely affecting the description of the present invention.

The duty modulator 600 comprises a comparator 602 that receives and compares two inputs. At one input (in the illustrated embodiment the non-inverting input) is applied $V_{ERROR}$, the output voltage of the voltage error amplifier 411. At the other input (in the illustrated embodiment the inverting input) is applied a voltage VISUM, which is the sum of three components. The first component relates to the voltage derived from the signal representative of the current sensed in the inductor, ISNS. As previously described, the current sensor 406 provides to the duty modulator 600 a current ISNS that is indicative of the current in the inductor. ISNS is connected to a node in between two resistors 603, 604. The opposite terminal of the lower resistor 604 is connected to a reference voltage which in the illustrated embodiment is ground. The opposite terminal of the upper resistor 603 is connected to the VISUM summing node at one of the inputs to the comparator 602.

The second component is provided by ISLP, the ramping slope compensation current from the slope compensation block 500. The third component is a pedestal current provided by a current source 601.

ISNS is trimmed to give a fixed transresistance, so that the transfer function from $V_{ERROR}$ to the actual output current is fixed, at least at room temperature. The trimming is to take account of device area mismatches inside the current sensor 406 and manufacturing tolerances of the resistor 604. It is achieved by trimming the ratio of current mirrors in the current sensor 406 (not illustrated). Nominally ISNS is proportional to $I_L$ (i.e. the load current), with a ratio in one embodiment of (1/40000). Post-trim trans-resistance, given by the voltage across the resistor 604 divided by the load current, is 0.133 ohm.

Since the voltage developed on 604 by ISNS is trimmed to be accurate in real terms, irrespective of manufacturing tolerances of internal resistors, it's also desirable that the voltage developed by ISLP is independent of this manufacturing tolerance. Thus ISLP is derived to be inversely proportional to on-chip resistors, not off-chip. Similarly, the current generated by current source 601 is inversely proportional to on-chip resistance to maintain its contribution to the pedestal voltage on VISUM independently of on-chip resistance.

By superposition, the voltage on VISUM is the sum of a term due to ISNS passing though the resistor 604 plus the I.R drop due to the current from the current source 601 and the current ISLP from the slope compensation block 500 passing through resistors 603 and 604. The resistor 603 gives different scaling factors for the sense current ISNS and slope current ISLP.

Thus, $$\text{VISUM} = I_{SNS}R_{604} + (I_{601} + I_{SLP})(R_{603} + R_{604})$$

Figure 7:
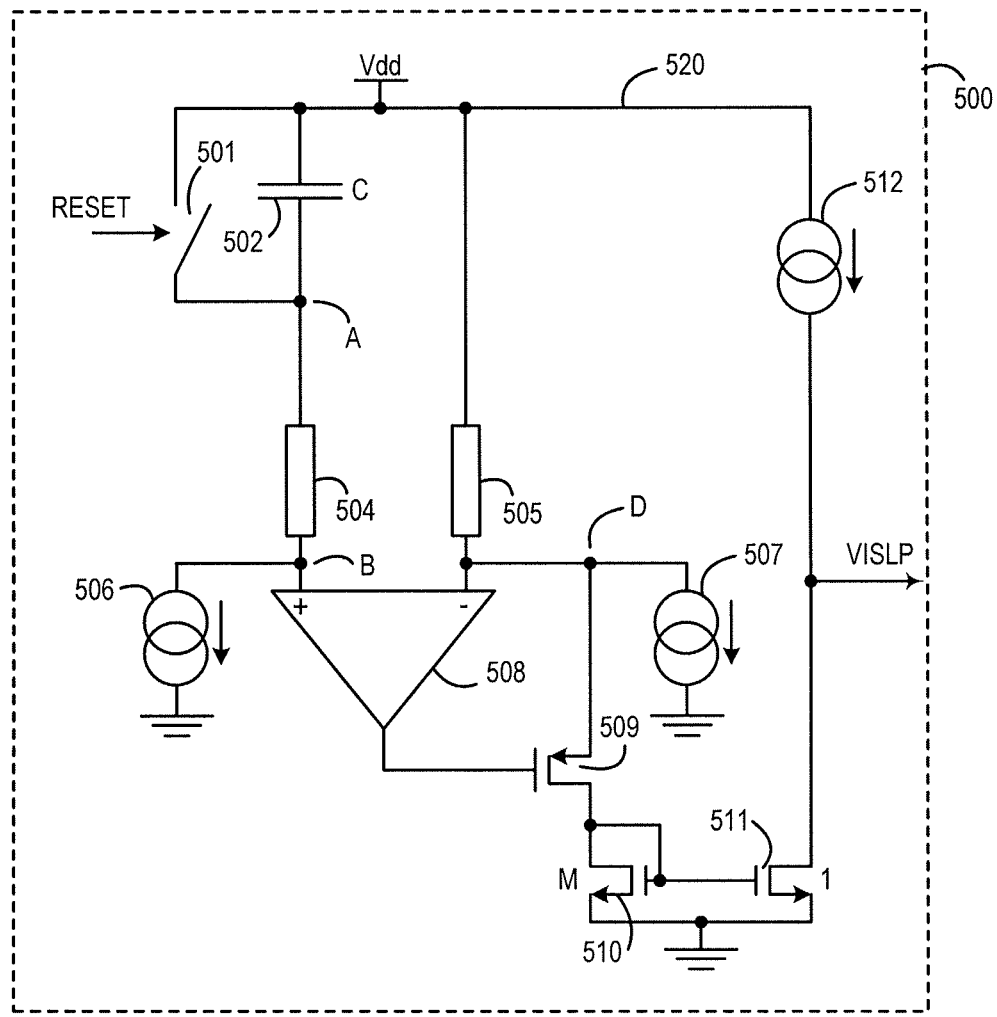
FIG. 7 shows slope compensation circuitry according to an embodiment of the present invention.

FIG. 7 shows in more detail the slope compensation ramp generator 500 according to embodiments of the present invention.

According to embodiments of the invention, in order to reduce the otherwise wide toleranced range of current loop gain, and the wide range of $V_{ERROR}$ voltage travel on the current summing node (i.e. the extremes of voltage range seen on the $V_{ERROR}$ control node under all conditions), a slope compensation ramp which is a function of the difference between input and output voltages, $V_{IN}$ and $V_{OUT}$, respectively may be used. The current loop gain affects the loop stability, as for a high performance design the reduction in tolerance effects enables better performance at typical and best-case for the same worst-case stability. The $V_{IN}$ dependence also helps the $V_{ERROR}$ voltage travel reduce at low $V_{IN}$: since $V_{ERROR}$ is the output of the error amplifier this means a wider output current range can be tolerated at larger $V_{IN}$.

Figure 8:
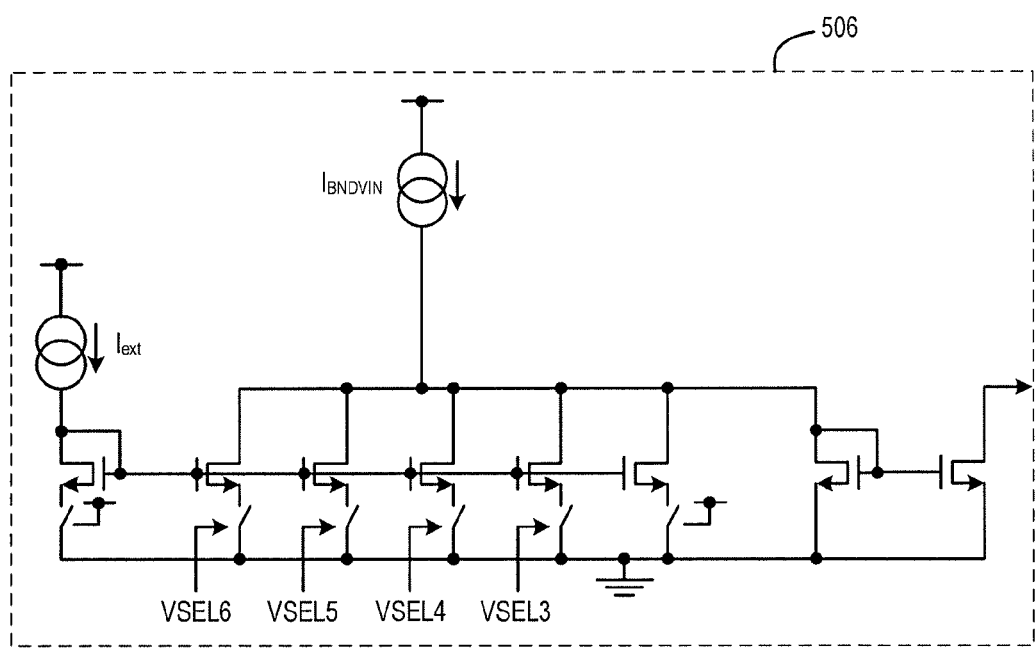
FIG. 8 shows a current source for use in the slope compensation circuitry according to an embodiment of the present invention.

In order to avoid monitoring $V_{OUT}$ with a resistor (which would necessarily have a high value of resistance in order to keep the power loss down to a minimum, thus making it physically large), the digital control bus $V_{SEL}$ (for example as shown in FIG. 1) may be used to programme an on-chip current to represent the output voltage (see FIG. 8).

The ramp generator 500 comprises a capacitor 502 connected in series between a supply rail 520 and a resistor 504. A switch 501 controllable by a signal RESET is connected in a shunt path around the capacitor 502. The opposite terminal of the resistor 504 is connected to an input of an amplifier 508 (in the illustrated embodiment the non-inverting input). Another resistor 505 is connected in series between the supply rail and the other input of the amplifier 508 (in the illustrated embodiment the inverting input). Also coupled to the non-inverting and inverting inputs of the amplifier 508 are a current sink 506 and another current sink 507, respectively.

The output of the amplifier 508 is coupled to the gate terminal of a PMOS transistor 509. The source terminal of the transistor 509 is connected to the inverting input of the amplifier 508, and the drain terminal is connected to the drain terminal of an NMOS transistor 510. The source terminal of the transistor 510 is connected to a reference voltage which in the illustrated embodiment is ground. Further, the gate and drain terminals of the transistor 510 are connected together so that the transistor 510 forms a current mirror arrangement with a further NMOS transistor 511. That is, the gate terminals of the transistors 510, 511 are connected together, and the source terminal of the transistor 511 is connected to the reference voltage. The drain terminal of the transistor 511 is connected to an output of the ramp generator, and to a current source 512 that is connected in between the transistor 511 and the supply rail.

In operation the signal RESET opens the switch 501 at the start of each cycle, then closes it for at least a short period of time before the start of the next cycle. This RESET signal can either be a fixed short pulse derived from a suitable clock edge and delay, or it can be activated soon after the comparator 602 switches, since VISUM is then ignored until the next cycle, and deactivated at or shortly before the end of the clock cycle. In other embodiments, the RESET pulse may activate after the clock edge for a short duration, if the system design allows for this delay in the start of the slope compensation ramp.

The circuit operates as follows. When the reset switch 501 is closed, the voltage across the capacitor C is zero, and the voltage between rail 520 and the op amp non-inverting input is $I_{506} \cdot R_{504}$. When the reset switch 501 is opened, the capacitor C is charged with the constant current $I_{506}$ so the voltage on node A falls linearly with a slope $I_{506}/C$. The voltage on node B also falls with the same slew rate. The opamp feedback maintains node D at the same voltage as node B, so the current through resistor 505 also ramps linearly from an initial value $I_{506} \cdot R_{504}/R_{505}$ with a slew rate of $(I_{506}/C)/R_{505}$.

The current through PMOS 509 is equal to the current through resistor 505 less the constant current $I_{507}$, so has a starting value of $I_{506} \cdot R_{504}/R_{505} \cdot I_{507}$ and a ramp rate of $(I_{506}/C)/R_{505}$. This current is then divided by a factor M by current mirror 510/511, and subtracted from a standing bias current $I_{512}$ to give the current output of the ramp generator 500, ISLP, equal to $$I_{SLP}(t) = I_{512} + \frac{I_{507}}{M} - \frac{R_{504}}{R_{505}M}I_{506} - \frac{I_{506}}{MC_{502}R_{505}}t$$

where t is the time that has elapsed since the most recent clock signal, and M is the scaling ratio between the transistors 510, 511.

It is evident that if the currents $I_{506}$, $I_{507}$ and $I_{512}$ are ratiometric with an external current reference, i.e. they are defined absolutely, independent of any manufacturing tolerance of on-chip resistors, then the slew rate term of ISLP is inversely proportional to $R_{505}$, i.e. inversely dependent on any manufacturing variations of an on-chip resistor. When this current ramp is imposed on on-chip resistors 603, 604 the added voltage contribution seen at the VISUM output node due to the slope compensation ramp generator block 500 is a fixed voltage offset (dependent on on-chip resistances) plus a time dependent ramp voltage independent of manufacturing tolerance in the on-chip resistors. The voltage offset may be reduced to zero by judicious scaling of $I_{506}$, $I_{507}$, $I_{512}$, $R_{504}$, $R_{505}$, and M. If $I_{506}$ were inversely dependent on on-chip resistances, then the slew rate of ISLP would be inversely dependent on the square of on-chip resistances, and the voltage slew rate on VISUM would then be inversely dependent on on-chip resistance.

The pedestal value of ISLP during reset can be eliminated by deriving the currents $I_{507}$, $I_{512}$ with the same dependency as $I_{506}$ and by suitable scaling of $I_{506}$, $I_{507}$, $I_{512}$, $R_{504}$, $R_{505}$, and M. For instance if $I_{506}$ and $I_{507}$ are identical, $I_{512}$ is half of that value, $R_{505}$ is half $R_{504}$ and M=2, then the current through $R_{505}$ is twice $I_{506}$, the current through PMOS 509 is equal to $I_{506}$, so the current through MOS 511 is half that, matching the current sourced by $I_{512}$. Then only the ramp term remains, which will give a resistance-independent voltage contribution to VISUM as explained above.

To make the slope proportional to $(V_{IN}-V_{OUT})$ as desirable, current source 506 (as well as current sources 507, 512) needs to be proportional to $(V_{IN}-V_{OUT})$ and independent of on-chip resistances, for example proportional to a current reference $I_{ext}$ dependent on a voltage reference and an accurate off-chip resistor. (Such a current reference may already be required for other purposes on a complete circuit.)

To do this, $V_{OUT}$ may be estimated by the output voltage programming bus signal, $V_{SEL}$ and the corresponding current components generated by a current DAC using a reference current derived from the above external current reference. This avoids the need to load the output with a high value, and hence physically large, resistor, possibly an external resistor involving at least one extra package pin. But to generate the $V_{IN}$ dependency also requires a current proportional to $V_{IN}$ and proportional to the same absolute external current reference.

FIG. 8 shows the detail of the current source 506 according to one embodiment, and, by extension, the other current sources 507, 512. For example, current sources 507, 512 could be mirrored from current source 506, or vice versa.

The current source 506 comprises a plurality of NMOS transistors connected in parallel, with a drain terminal of each transistor connected to a current source $I_{BNDVIN}$, and a source terminal of each transistor selectively coupled to ground via a plurality of respective switches. The gate terminal of each transistor is connected to an external reference current source $I_{ext}$. In operation, the switches are opened and closed according to a control signal that controls the output voltage of the converter 400, e.g. the $V_{SEL}$ bus. The switches may be binary-weighted according to the bits of the binary control signal $V_{SEL}$, or otherwise weighted in correspondence with the control signal, so that the current that passes from $I_{BNDVIN}$ to the output through the plurality of transistors is proportional to the output voltage $V_{OUT}$. That is, the switches controlled by the bits of the $V_{SEL}$ control bus select a binary-weighted set of devices to produce a current DAC whose output current is ratiometric with the output voltage and is scaled relative to an external constant current reference.

Clearly, the scaling of $I_{BNDVIN}$ should be according to the same external constant current reference. However, this current reference should also be proportional to the input voltage $V_{IN}$, such that the output current $I_{506}$ is proportional to $V_{IN}$–$V_{OUT}$.

Figure 9:
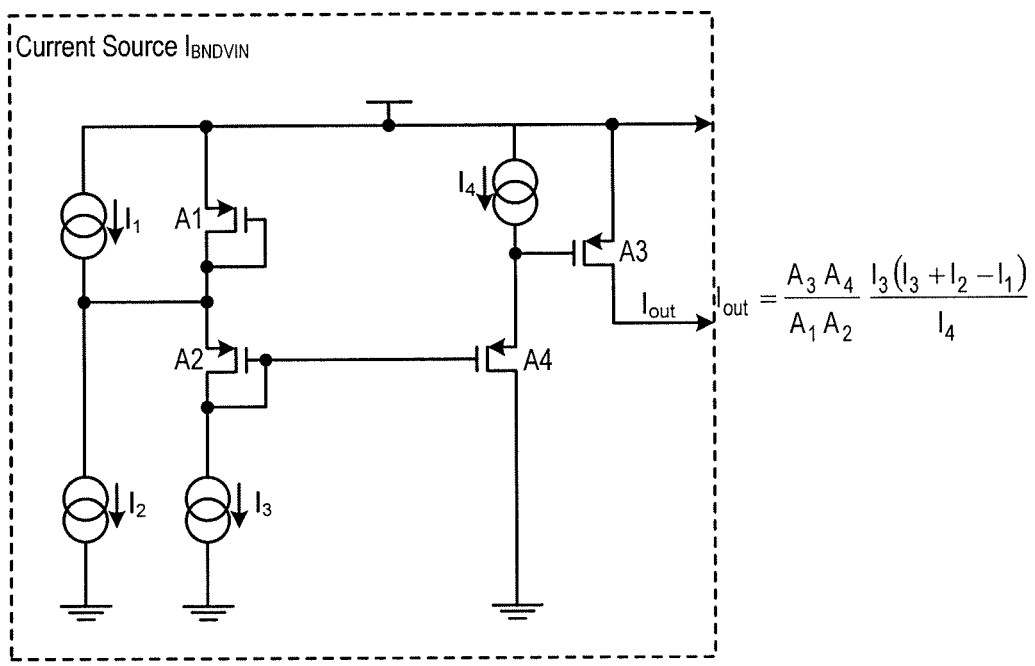
FIG. 9 shows a current source for use in the current source described with respect to FIG. 8.

FIG. 9 shows a simplified diagram of the current source $I_{BNDVIN}$ according to an embodiment of the present invention. The current $I_{BNDVIN}$ is proportional to the input voltage, $V_{IN}$. It will be apparent to those skilled in the art that other circuit implementations are possible for generating $I_{BNDVIN}$, for example based on bipolar transistors or different topologies. However, the illustrated embodiment has the overall result of generating a current which is ratiometric in (or proportional to) the input voltage, and, at the same time, in the external current reference.

Assuming PMOS P1, P2, P3, and P4 are in subthreshold and aspect ratios A1, A2, A3, A4 each give the same saturation current $I_s$, such that for each transistor $$V_{GS} = V_{ON} + \frac{nkT}{q}\ln(I/AI_s),$$

where $V_{GS}$ is the gate-source voltage, $V_{ON}$ is the ON voltage (comprising a threshold voltage term), n is a wafer-process-dependent ideality factor generally between 1 and 2, k is the Boltzmann constant, T is the temperature, q is the charge of an electron, $I_s$ is the current through a unity aspect ratio transistor when $V_{GS}=V_{ON}$ and I is the current through the respective transistor P1, P2, P3, or P4.

Then by inspection of the circuit:

$$V_{GSP1} + V_{GSP2} = V_{GSP3} + V_{GSP4}$$

which implies $$\ln(I_{P1}/A_1) + \ln(I_{P2}/A_2) = \ln(I_{P3}/A_3) + \ln(I_{P4}/A_4)$$

i.e.

$$\ln(I_2 + I_3 - I_1) + \ln(I_3) + \ln(A_3 A_4 / A_1 A_2) = \ln(I_4) + \ln(I_{out})$$

It can thus be shown that the output current is as follows:

$$I_{out} \equiv \frac{A_3 A_4}{A_1 A_2} \frac{I_3(I_3 + I_2 - I_1)}{I_4}$$

which, if $I_1$ equals $I_3$, reduces to $$I_{out} \equiv \frac{A_3 A_4}{A_1 A_2} \frac{I_3 I_2}{I_4}$$

If $I_3$ is an external current reference $I_{ext}$, $I_2$ is an input-voltage defined current created with an internal resistor, and $I_4$ is a bandgap reference voltage-defined current created with the same resistor type, then the output current reduces to:

$$I_{out} \equiv K I_{ext} \frac{V_{IN}}{V_{BG}}$$

where $V_{BG}$ may be an internal bandgap voltage reference, for example as used to supply $V_{REF}$ 414 in FIG. 4 where K is a proportionality constant defined by the aspect ratios of the transistors and the scaling factors used in deriving $I_2$ and $I_4$ from the respective voltages.

The slope compensation ramp rate may be made adjustable, for instance to accommodate different values of inductor L, by making elements such as capacitor 502 or current mirror ratios in current source 506 programmable by known techniques.

Having thus described the operation of the slope compensation ramp generator 500, it is now possible to derive a value for $I_{PRESET}$, the current generated in the preset block 418, in order to precharge the control node of the duty modulator 600 to a value of $V_{ERROR}$. This may be achieved by estimating the value of VISUM at the switching time $t_S$ (the time after the clock pulse at which the NMOS 20 switches off and the PMOS 10 switches on), i.e. the point at which, in normal operation, VISUM and $V_{ERROR}$ intersect as $V_{ERROR}$ may be assumed to be approximately constant across a clock cycle.

As previously explained, and by inspection of FIG. 6, VISUM has three components: a signal ISNS representative of the inductor current, the slope compensation current ISLP, and a pedestal current provided by current source 601.

Figure 10:
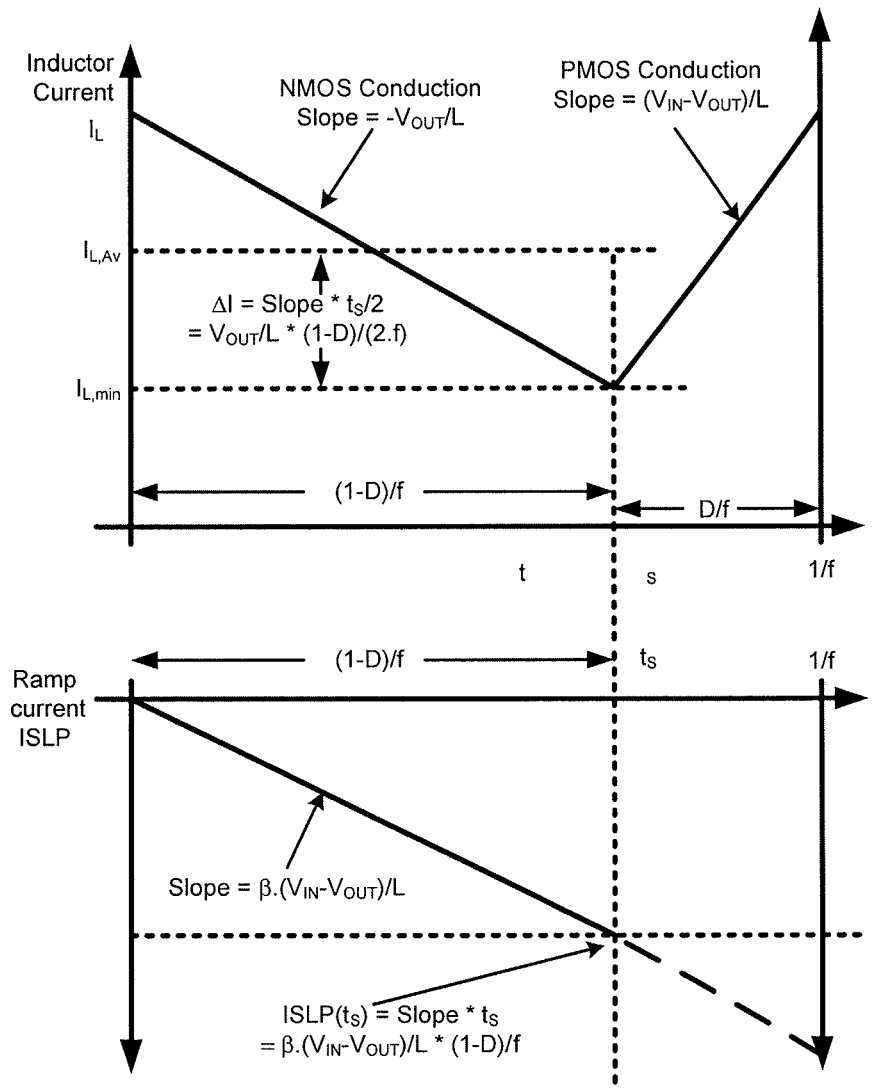
FIG. 10 shows in more detail the waveforms for a buck converter operating in valley control mode.

FIG. 10 shows the waveforms of inductor current $I_L$ and slope current ISLP for the illustrated case of a buck converter operating in valley control mode.

In valley control mode, the switching time $t_S$ is equal to the amount of time the NMOS 20 is on in any one clock cycle. This may be calculated using the duty cycle D of the converter 400 (defined as the amount of time per clock cycle the PMOS 10 is on). If f is the clock frequency, $$t_s = \frac{(1-D)}{f} = \frac{(V_{IN} - V_{OUT})}{V_{IN} f}$$

By inspection of the waveform, the inductor current at the switching time $t_S$ is then equal to $$I_L(t_s) = I_{L,Av} - \frac{V_{OUT}}{L} \frac{(V_{IN} - V_{OUT})}{2 V_{IN} f}$$

where $I_{L,Av}$ is the average inductor current. $I_L$ is scaled by a factor α (in one embodiment (1/40000)) to produce a conveniently sized signal ISNS. That is, α is the current gain of the current sensor circuit 406.

As shown, the slope compensation current ramp rate is $(\beta/L) \cdot (V_{IN} - V_{OUT})$ where β is a proportionality constant chosen by the designer to adjust the amount of slope compensation and to compensate for ISLP being applied over both $R_{603}$ and $R_{604}$ rather than just over $R_{604}$. The parameter β also implicitly includes a factor α since the slope compensation ramp is subtracted from the sensed representation of the inductor current rather than the actual inductor current $I_L$. The slope compensation current ramp rate is inversely proportional to L as the desired slope should track the inductor current $I_L$ up-slope. In implementation, this factor may be set and/or programmable via current mirror ratios and/or resistor ratios.

Thus the slope compensation current ISP at the switching time $t_S$ is equal to $$I_{SLP}(t_s) = \frac{\beta(V_{IN} - V_{OUT})}{L} \frac{(1-D)}{f}$$

$$= \frac{\beta(V_{IN} - V_{OUT})}{L} \frac{(V_{IN} - V_{OUT})}{V_{IN} f}$$

The value of VISUM at $t_S$ (i.e. the value of $V_{ERROR}$) is therefore the sum of a component due to the slope compensation, a component due to the sensed inductor current, and a component due to the pedestal current provided by current source 601. By inspection of FIG. 6, $$V_{ERROR} = \left\{ I_{L,Av} - \frac{V_{OUT}}{L} \frac{(V_{IN} - V_{OUT})}{2V_{IN} f} \right\} \alpha R_{604} +$$

$$I_{601}(R_{603} + R_{604}) + I_{xx} R_{604} +$$

$$\left\{ \frac{\beta(V_{IN} - V_{OUT})}{L} \frac{(V_{IN} - V_{OUT})}{V_{IN} f} \right\}(R_{603} + R_{604})$$

$$= R_{SNS}\left[\left(I_{L,Av} + \frac{I_{xx}}{\alpha} + \frac{I_{601}}{\alpha} \frac{(R_{603} + R_{604})}{R_{604}}\right) - \right.$$

$$\left. \frac{k}{fL} \frac{(V_{IN} - V_{OUT})}{V_{IN}} \left\{ V_{IN} - \left(1 - \frac{1}{2k}\right) V_{OUT} \right\} \right]$$

where $R_{SNS}$ is equal to $\alpha R_{604}$ (where a is the current gain of the current sensor 406), and k is a constant dependent on $\alpha$, $\beta$, $R_{603}$ and $R_{604}$. $I_{XX}$ is an inductor-referred pedestal current of the current sensor circuit 406. Note that $\beta$ is negative in this case of a regulator circuit operating in valley control mode, i.e. slope compensation current is removed from the summing node.

The current in current source 424, $I_{preset}$ may therefore be set to:

$$I_{preset} = \frac{R_{SNS}}{R_{preset}}\left[\left(I_{L,Av} + \frac{I_{xx}}{\alpha} + \frac{I_{601}}{\alpha} \frac{(R_{603} + R_{604})}{R_{604}}\right) - \right.$$

$$\left. \frac{k}{fL} \frac{(V_{IN} - V_{OUT})}{V_{IN}} \left\{ V_{IN} - \left(1 - \frac{1}{2k}\right) V_{OUT} \right\} \right]$$

$$= \frac{R_{SNS}}{R_{preset}}\left[(I_{L,Av} + I_{PED}) - \frac{k}{fL} \frac{(V_{IN} - V_{OUT})}{V_{IN}} \{V_{IN} - \right.$$

$$\left. \left(1 - \frac{1}{2k}\right) V_{OUT}\right\}\right]$$

where $$I_{PED} = \frac{I_{xx}}{\alpha} + \frac{I_{601}}{\alpha} \frac{(R_{603} + R_{604})}{R_{604}}.$$

This may be approximated by:

$$I_{preset} \cong \frac{R_{SNS}}{R_{preset}}\left[(I_{L,Av} + I_{PED}) - \frac{k}{fL} \frac{(V_{IN} - \chi V_{OUT})^2}{V_{IN}}\right]$$

where $\chi$ is a constant, which may be found through empirical optimization of the approximation.

It will be apparent to those skilled in the art that the above two equations are not those normally associated with regulator circuits. In particular, by accurately estimating the value of $V_{ERROR}$ and precharging the control node correspondingly, transients in the output voltage are reduced greatly when switching between modes with an active error amplifier and modes with an inactive error amplifier.

Figure 11:
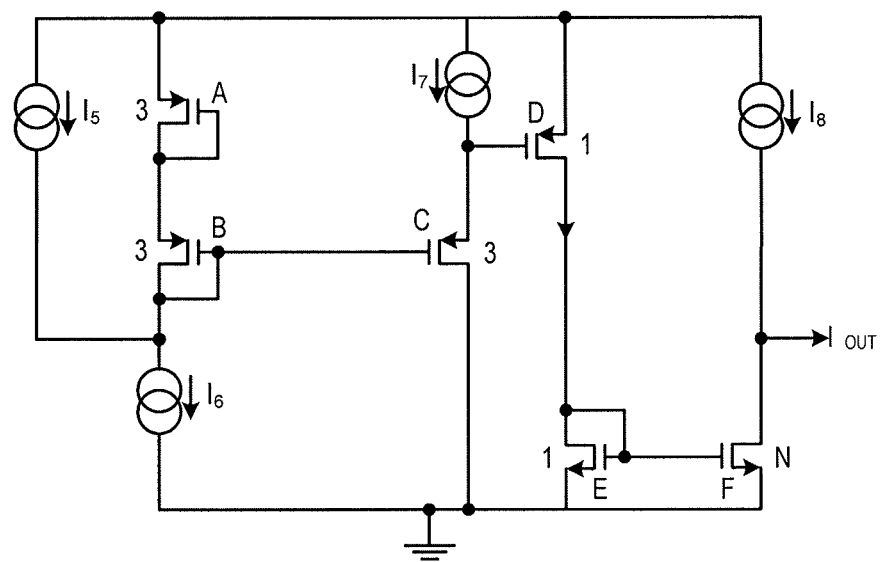
FIG. 11 shows a current source according to one embodiment for use in the preset circuitry.

FIG. 11 shows a circuit for the implementation of the current source 424 according to one embodiment. The current $I_{PRESET}$ is generated in this embodiment by a translinear circuit.

The circuit comprises a PMOS transistor (labelled "A") connected in diode mode, with its gate terminal connected directly to its drain terminal. Also connected to the drain terminal of transistor A is the source terminal of a further PMOS transistor (labelled "B"). Transistor B is also connected in diode mode with its gate terminal connected directly to its drain terminal. Also connected to the drain terminal of transistor B is a current source generating a current $I_6$. The opposite terminal of the current source $I_6$ is connected to a reference voltage, which in the illustrated embodiment is ground. Connected in parallel with transistors A and B is a further current source generating a current $I_5$, connected to the source terminal of transistor A and the drain terminal of transistor B.

Transistor B is connected in a current mirror arrangement with a further PMOS transistor (labelled "C"), with the gate terminals of the two transistors B and C being connected together. The drain terminal of transistor C is connected to the reference voltage, and the source terminal is connected to a further current source generating a current $I_7$.

The source terminal of transistor C is also coupled to the gate terminal of a further PMOS transistor (labelled "D"). The drain terminal of transistor D is coupled to the drain terminal of an NMOS transistor (labelled "E") which is connected in a further current-mirror arrangement with another NMOS transistor (labelled "F"). The drain and gate terminals of transistor E are directly connected together, and the source terminal is connected to the reference voltage. The source terminal of transistor F is connected to the reference voltage, and the drain terminal is connected to an output, providing current $I_{OUT}$. The output is further connected to a current source providing current $I_8$.

If PMOS transistors A, B, C and D are in subthreshold and transistors A, B and C are three times the aspect ratio of transistor D, then $$V_{GSD} = V_{ON} + \frac{nkT}{q}\ln\left(\frac{I_D}{I_S}\right)$$

and $$V_{GSA} = V_{ON} + \frac{nkT}{q}\ln\left(\frac{I_A}{3I_S}\right) \text{etc.}$$

Transistor E has an aspect ratio of 1, and transistor F has an aspect ratio of N.

By inspection of the circuit:

$$V_{GSA} + V_{GSB} = V_{GSC} + V_{GSD}$$

implies $$\ln(I_A/3) + \ln(I_B/3) = \ln(I_C/3) + \ln(I_D)$$

i.e.

$$\ln(I_6 - I_5) + \ln(I_6 - I_5) = \ln(I_7) + \ln(I_D) + \ln(3)$$

so $$I_D = \frac{(I_6 - I_5)^2}{3I_7}$$

and $$I_{OUT} = I_8 - NI_D = I_8 - N\frac{(I_6 - I_5)^2}{3I_7}$$

By setting $$I_8 = a_0(I_{L,Av} + I_{PED})$$

$$I_7 = a_1\frac{V_{IN}}{R_{INT}}$$

$$I_6 = a_2\frac{V_{IN}}{R_{INT}}$$

$$I_5 = a_3\frac{\chi V_{OUT}}{R_{INT}}$$

where $R_{INT}$ is some internal resistor reference, $a_0$, $a_1$, $a_2$ and $a_3$ are scaling factors set to scale the currents to convenient magnitudes, and by setting N appropriately and scaling $I_{OUT}$ as necessary, the required value for $I_{PRESET}$ may be generated.

The factor of 3 above is just for convenience of implementing appropriate bias sources and device sizes in the particular implementation. The skilled person will realize that alternative methods of scaling may be used without inventive skill and without departing from the scope of the present invention.

In applications where the load current is expected to be small initially, for example in gradual power-up of a system from an off state or a sleep mode, $I_{L,Av}$ may be set at zero.

Figure 12:
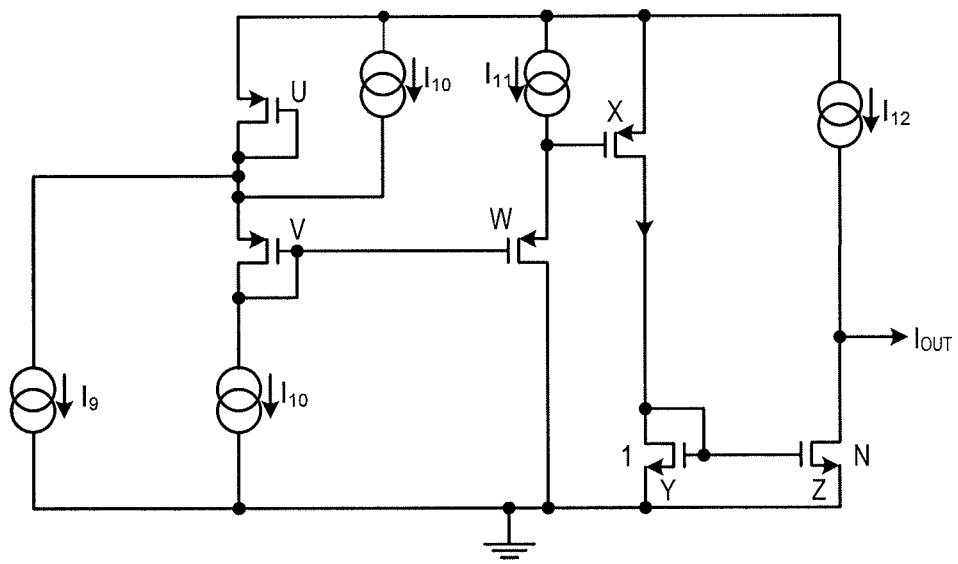
FIG. 12 shows a current source according to another embodiment for use in the preset circuitry.

FIG. 12 shows a circuit for the implementation of the current source 424 according to embodiments of the present invention for estimating the error signal $V_{ERROR}$ without approximating the equation. That is, using the equation $$I_{preset} = \frac{R_{SNS}}{R_{preset}}\left[(I_{L,Av} + I_{PED}) - \frac{k}{fL}\frac{(V_{IN} - V_{OUT})}{V_{IN}}\left\{V_{IN} - \left(1 - \frac{1}{2k}\right)V_{OUT}\right\}\right]$$

The circuit comprises a PMOS transistor (labelled "U") connected in diode mode, with its gate terminal connected directly to its drain terminal. Also connected to the drain terminal of transistor A is the source terminal of a further PMOS transistor (labelled "V"). Transistor V is also connected in diode mode with its gate terminal connected directly to its drain terminal. Also connected to the drain terminal of transistor V is a first current source generating a current $I_{10}$. The opposite terminal of the first current source $I_{10}$ is connected to a reference voltage, which in the illustrated embodiment is ground. Connected in parallel with transistor V and the first current source $I_{10}$ is a further current source generating a current $I_9$, connected to the source terminal of transistor V and the reference voltage. A second current source generating current $I_{10}$ is connected in parallel with transistor U, being connected to the source and drain terminals of transistor U.

Transistor V is connected in a current mirror arrangement with a further PMOS transistor (labelled "W"), with the gate terminals of the two transistors V and W being connected together. The drain terminal of transistor W is connected to the reference voltage, and the source terminal is connected to a further current source generating a current $I_{11}$.

The source terminal of transistor W is also coupled to the gate terminal of a further PMOS transistor (labelled "X"). The drain terminal of transistor X is coupled to the drain terminal of an NMOS transistor (labelled "Y") which is connected in a further current-mirror arrangement with another NMOS transistor (labelled "Z"). The drain and gate terminals of transistor Y are directly connected together, and the source terminal is connected to the reference voltage. The source terminal of transistor Z is connected to the reference voltage, and the drain terminal is connected to an output, providing current $I_{OUT}$. The output is further connected to a current source providing current $I_{12}$.

By setting $$I_{12} = a_0(I_{L,Av} + I_{PED})$$

$$I_9 = a_1\frac{V_{IN} - V_{OUT}}{R_{INT}}$$

$$I_{10} = a_2\frac{V_{IN} - \left(1 - \frac{1}{2k}\right)V_{OUT}}{R_{INT}}$$

$$I_{11} = a_3\frac{V_{IN}}{R_{INT}}$$

where $a_0$, $a_1$, $a_2$ and $a_3$ are constants set to scale the operating currents to convenient ranges, and by setting N appropriately and scaling $I_{OUT}$ as necessary, the required value for $I_{PRESET}$ may be generated.

The description above has concentrated on the example of a buck converter operating in valley control mode. However, the invention is also applicable to peak control mode, as well as boost converters and buck-boost converters. It will be shown below that the analysis for these other cases yields similar expressions for $V_{ERROR}$ and $I_{preset}$ comprising terms in $V_{IN}$, $V_{OUT}$ that can be implemented by the same or similar circuits with appropriate scaling of devices or currents.

Figure 13:
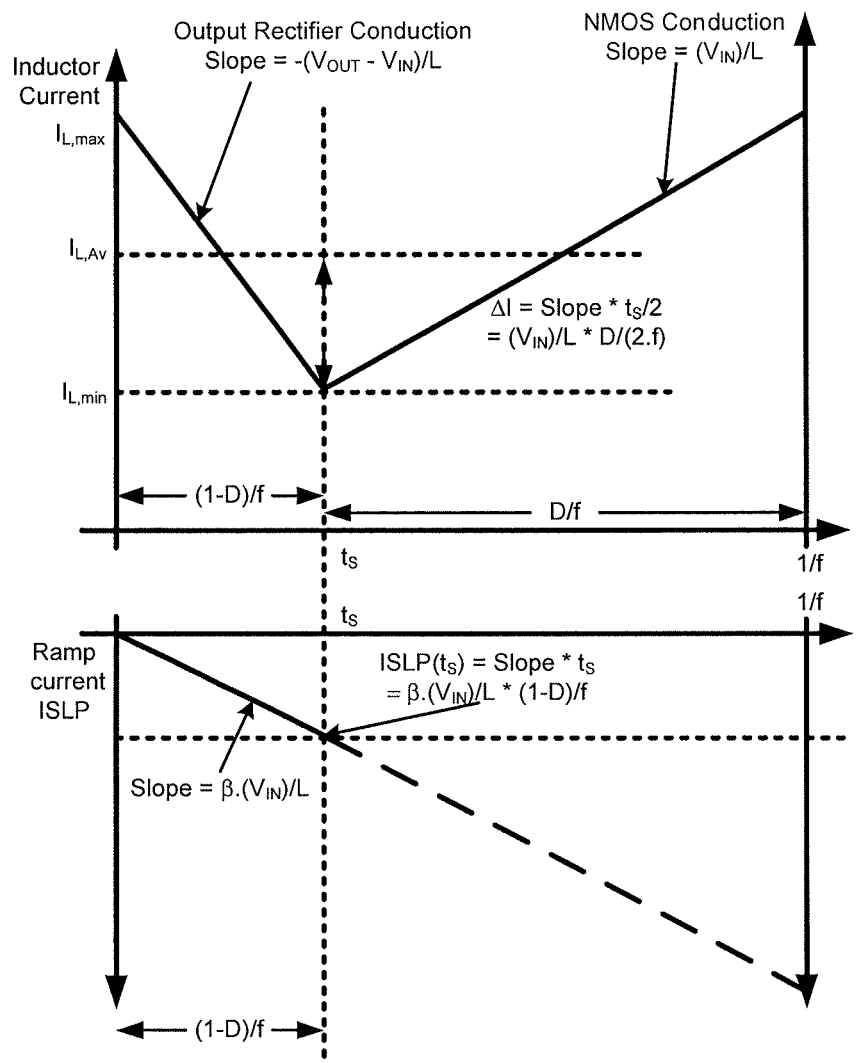
FIG. 13 shows the waveforms for a boost converter operating in valley control mode.

FIG. 13 shows the waveforms for inductor current $I_L$ and slope compensation current ISLP for a boost converter operating in valley control mode.

By similar analysis to the above, it may be shown that $$V_{ERROR} = R_{SNS}\left[(I_{L,Av} + I_{PED}) - \frac{k}{fL}\frac{V_{IN}}{V_{OUT}}\left\{\frac{(V_{OUT} - V_{IN})}{2k} + V_{IN}\right\}\right]$$

which is an equation of similar form to that of a buck converter in valley mode.

The circuit described with respect to FIG. 12 may also be used to generate the appropriate value of $I_{preset}$ in this situation.

By setting $$I_{12} = a_0(I_{L,Av} + I_{PED})$$

$$I_9 = a_1\frac{V_{IN}}{R_{INT}}$$

$$I_{10} = a_2\frac{V_{IN} + \frac{(V_{OUT} - V_{IN})}{2k}}{R_{INT}}$$

$$I_{11} = a_3\frac{V_{OUT}}{R_{INT}}$$

Where $a_0$, $a_1$, $a_2$ and $a_3$ are constants, and by setting N appropriately and scaling $I_{OUT}$ as necessary, the required value for $I_{PRESET}$ may be generated.

Figure 14:
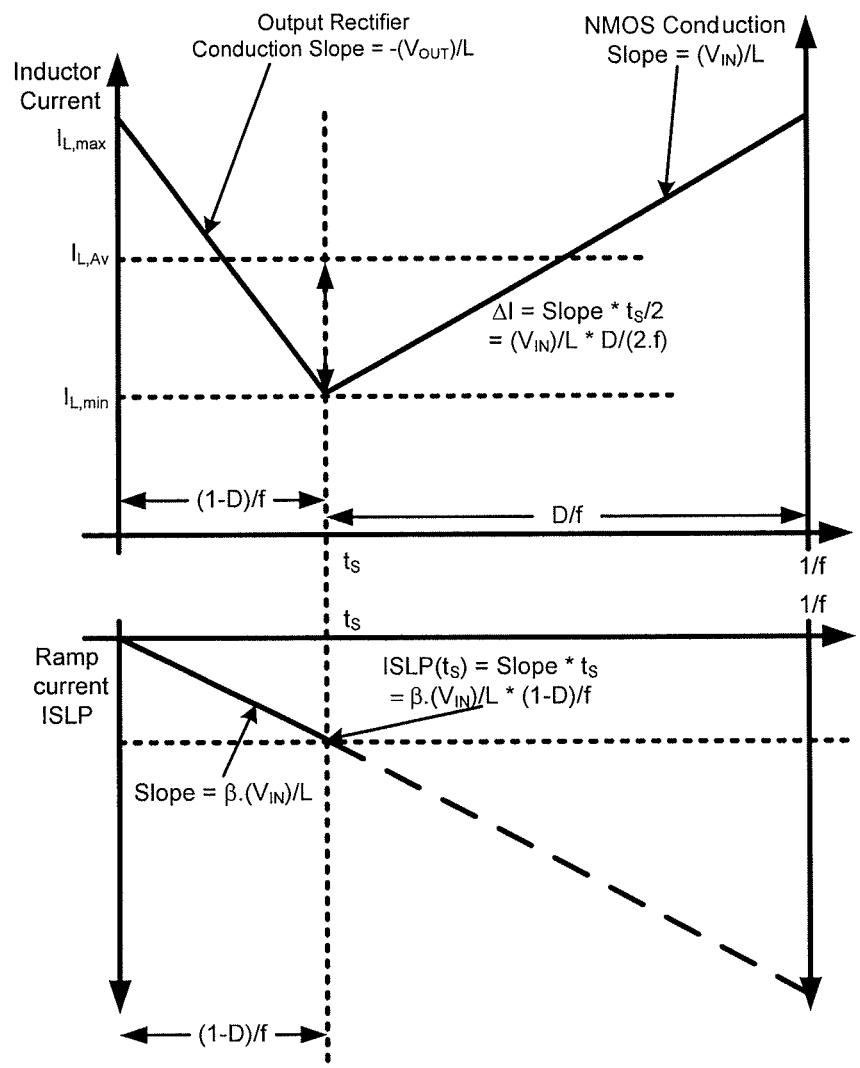
FIG. 14 shows the waveforms for a buck-boost converter operating in valley control mode.

FIG. 14 shows the waveforms for inductor current $I_L$ and slope compensation current ISLP for a buck-boost converter operating in valley control mode.

By similar analysis to the above, it may be shown that $$V_{ERROR} = R_{SNS}\left[(I_{L,Av} + I_{PED}) - \frac{k}{fL}\frac{V_{IN}}{(V_{IN} + V_{OUT})}\left\{V_{IN} + \frac{V_{OUT}}{2k}\right\}\right]$$

which is an equation of similar form to that of a buck converter in valley mode.

The circuit described with respect to FIG. 12 may also be used to generate the appropriate value of $I_{preset}$ in this situation.

By setting $$I_{12} = a_0(I_{L,Av} + I_{PED})$$

$$I_9 = a_1 \frac{V_{IN}}{R_{INT}}$$

$$I_{10} = a_2 \frac{V_{IN} + \frac{V_{OUT}}{2k}}{R_{INT}}$$

$$I_{11} = a_3 \frac{V_{IN} + V_{OUT}}{R_{INT}}$$

Where $a_0$, $a_1$, $a_2$ and $a_3$ are constants, and by setting N appropriately and scaling $I_{OUT}$ as necessary, the required value for $I_{PRESET}$ may be generated.

Figure 15:
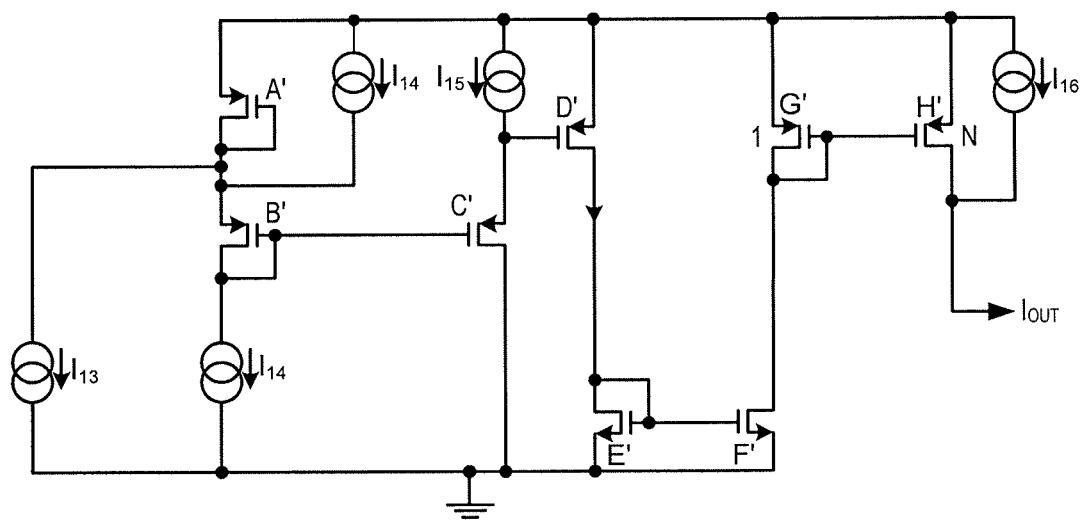
FIG. 15 shows a current source according to one embodiment for use in the preset circuitry of a converter operating in peak control mode.

FIG. 15 shows a circuit for the implementation of the current source 424 according to embodiments in a converter operating in peak control mode. The current $I_{PRESET}$ is generated in this embodiment by a translinear circuit.

The circuit comprises a PMOS transistor (labelled A') connected in diode mode, with its gate terminal connected directly to its drain terminal. Also connected to the drain terminal of transistor A' is the source terminal of a further PMOS transistor (labelled B'). Transistor B' is also connected in diode mode with its gate terminal connected directly to its drain terminal. Also connected to the drain terminal of transistor B' is a first current source generating a current $I_{14}$. The opposite terminal of the first current source $I_{14}$ is connected to a reference voltage, which in the illustrated embodiment is ground. Connected in parallel with transistor B' and the first current source $I_{14}$ is a further current source generating a current $I_{13}$, connected to the source terminal of transistor B' and the reference voltage. A second current source generating current $I_{14}$ is connected in parallel with transistor A', being connected to the source and drain terminals of transistor A'.

Transistor B' is connected in a current mirror arrangement with a further PMOS transistor (labelled C'), with the gate terminals of the two transistors B' and C' being connected together. The drain terminal of transistor C' is connected to the reference voltage, and the source terminal is connected to a further current source generating a current $I_{15}$.

The source terminal of transistor C' is also coupled to the gate terminal of a further PMOS transistor (labelled D'). The drain terminal of transistor D' is coupled to the drain terminal of an NMOS transistor (labelled E') which is connected in a further current-mirror arrangement with another NMOS transistor (labelled F'). The drain and gate terminals of transistor E' are directly connected together, and the source terminal is connected to the reference voltage. The source terminal of transistor F' is connected to the reference voltage, and the drain terminal is connected to the drain terminal of a further PMOS transistor (labelled G') which is connected in a further current-mirror arrangement with another PMOS transistor (labelled H'). The drain and gate terminals of transistor G' are directly connected together. The drain terminal of transistor H' is connected to an output, providing current $I_{OUT}$. A current source providing current $I_{16}$ is connected in parallel with the transistor H'.

Figure 16:
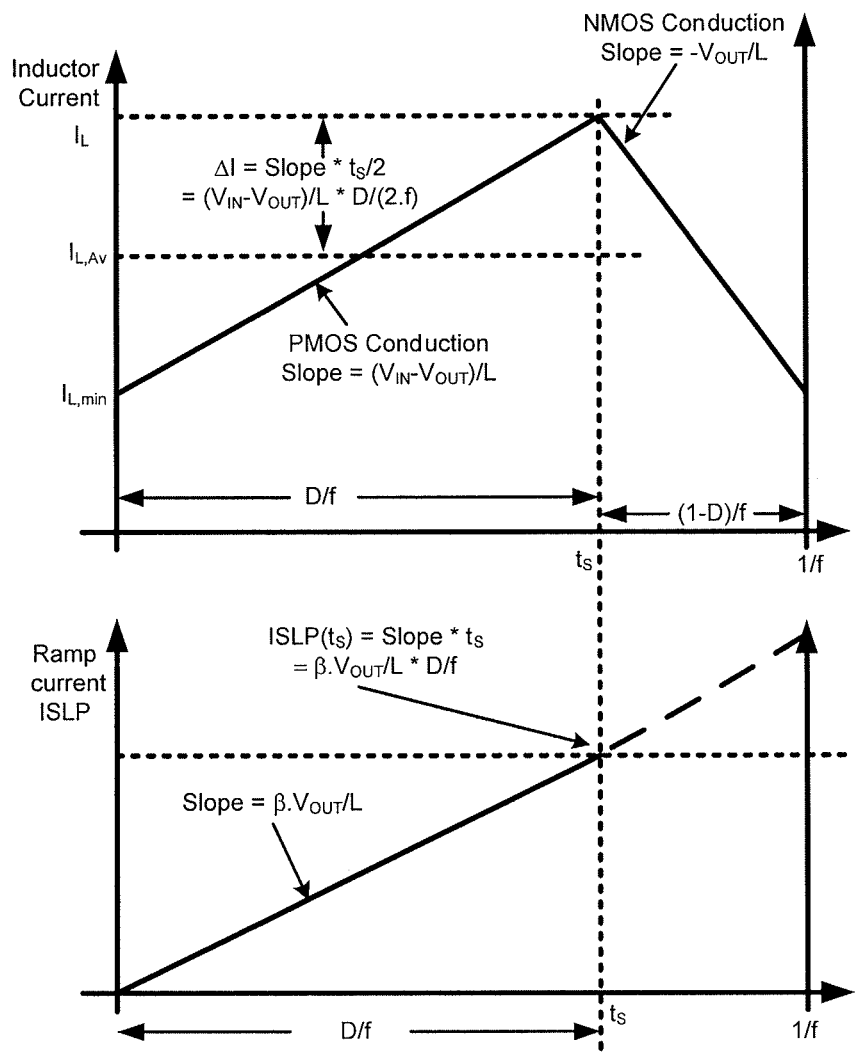
FIG. 16 shows the waveforms for a buck converter operating in peak control mode.

FIG. 16 shows the waveforms for inductor current $I_L$ and slope compensation current ISLP for a buck converter operating in peak control mode.

By similar analysis to the above, it may be shown that $$V_{ERROR} = R_{SNS}\left[(I_{L,Av} + I_{PED}) - \frac{k}{fL}\frac{V_{OUT}}{V_{IN}}\left\{V_{OUT} + \frac{(V_{IN} - V_{OUT})}{2k}\right\}\right]$$

which is an equation of similar form to that of a buck converter in valley mode.

The circuit described with respect to FIG. 15 may be used to generate the appropriate value of $I_{preset}$ in this situation.

By setting $$I_{16} = a_0(I_{L,Av} + I_{PED})$$

$$I_{13} = a_1 \frac{V_{OUT}}{R_{INT}}$$

$$I_{14} = a_2 \frac{V_{OUT} + \frac{(V_{IN} - V_{OUT})}{2k}}{R_{INT}}$$

$$I_{15} = a_3 \frac{V_{IN}}{R_{INT}}$$

Where $a_0$, $a_1$, $a_2$ and $a_3$ are constants, and by setting N appropriately and scaling $I_{OUT}$ as necessary, the required value for $I_{PRESET}$ may be generated.

Figure 17:
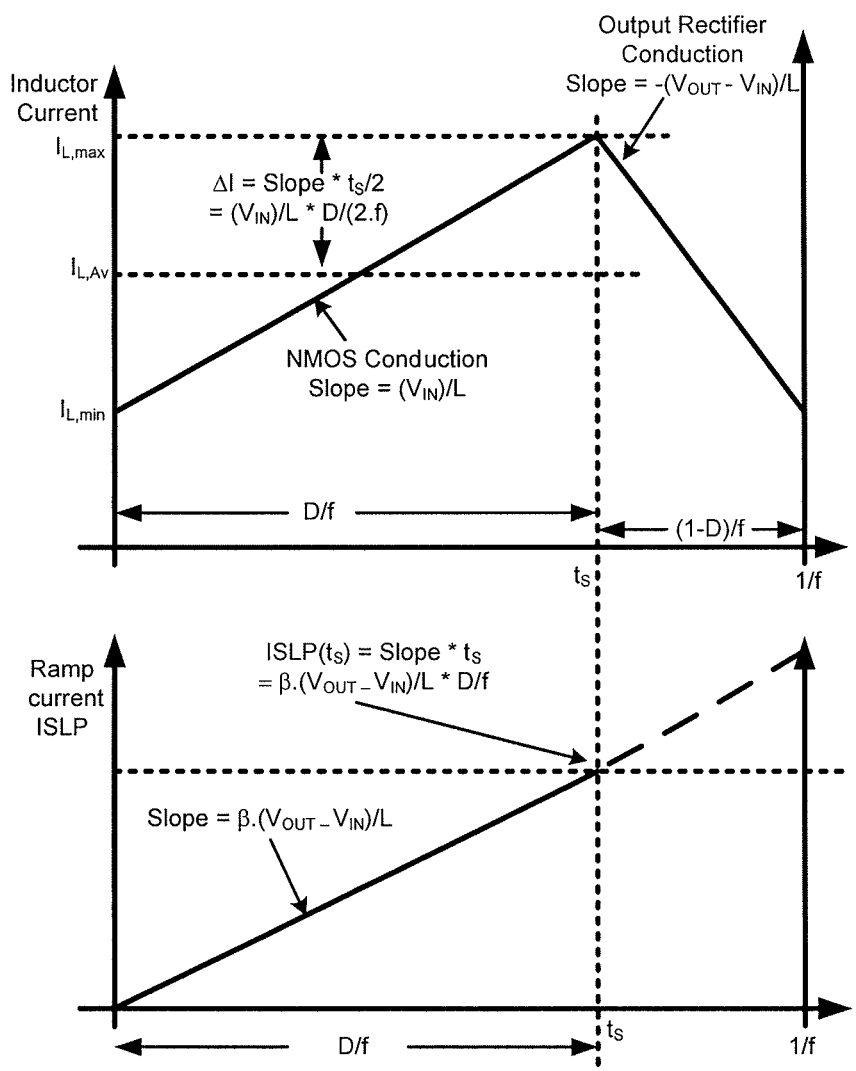
FIG. 17 shows the waveforms for a boost converter operating in peak control mode.

FIG. 17 shows the waveforms for inductor current $I_L$ and slope compensation current ISLP for a boost converter operating in peak control mode.

By similar analysis to the above, it may be shown that $$V_{ERROR} = R_{SNS}\left[(I_{L,Av} + I_{PED}) + \frac{k}{fL}\frac{(V_{OUT} - V_{IN})}{V_{OUT}}\left\{V_{OUT} - V_{IN} + \frac{V_{IN}}{2k}\right\}\right]$$

which is an equation of similar form to that of a buck converter in valley mode.

The circuit described with respect to FIG. 15 may also be used to generate the appropriate value of $I_{preset}$ in this situation.

By setting $$I_{16} = a_0(I_{L,Av} + I_{PED})$$

$$I_{13} = a_1 \frac{V_{OUT} - V_{IN}}{R_{INT}}$$

$$I_{14} = a_2 \frac{V_{OUT} - V_{IN} + \frac{V_{IN}}{2k}}{R_{INT}}$$

$$I_{15} = a_3 \frac{V_{OUT}}{R_{INT}}$$

Where $a_0$, $a_1$, $a_2$ and $a_3$ are constants, and by setting N appropriately and scaling $I_{OUT}$ as necessary, the required value for $I_{PRESET}$ may be generated.

Figure 18:
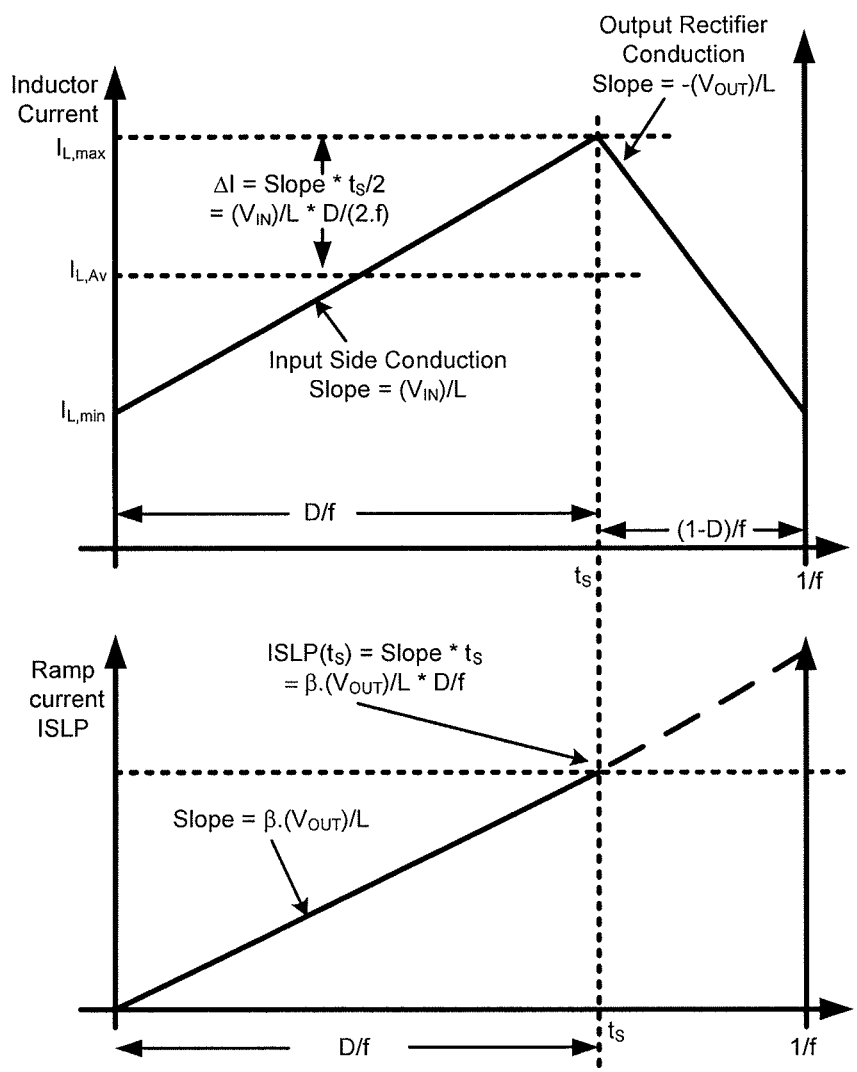
FIG. 18 shows the waveforms for a buck-boost converter operating in peak control mode.

FIG. 18 shows the waveforms for inductor current $I_L$ and slope compensation current ISLP for a buck-boost converter operating in peak control mode.

By similar analysis to the above, it may be shown that $$V_{ERROR} = R_{SNS}\left[(I_{L,Av} + I_{PED}) + \frac{k}{fL}\frac{V_{OUT}}{(V_{IN} + V_{OUT})}\left\{V_{OUT} + \frac{V_{IN}}{2k}\right\}\right]$$

which is an equation of similar form to that of a buck converter in valley mode.

The circuit described with respect to FIG. 15 may also be used to generate the appropriate value of $I_{preset}$ in this situation.

By setting $$I_{16} = a_0(I_{L,Av} + I_{PED})$$

$$I_{13} = a_1\frac{V_{OUT}}{R_{INT}}$$

$$I_{14} = a_2\frac{V_{OUT} + \frac{V_{IN}}{2k}}{R_{INT}}$$

$$I_{15} = a_3\frac{V_{IN} + V_{OUT}}{R_{INT}}$$

Where $a_0$, $a_1$, $a_2$ and $a_3$ are constants, and by setting N appropriately and scaling $I_{OUT}$ as necessary, the required value for $I_{PRESET}$ may be generated.

The above analysis demonstrates that the technique is applicable to many examples of DC-DC converter topologies besides the initial example of a buck converter operating in valley control mode. The invention is applicable to peak control mode, as well as to boost converters and buck-boost converters. The analysis for these other cases yields similar expressions for $V_{ERROR}$ and $I_{preset}$ comprising terms in $V_{IN}$ and $V_{OUT}$ that can be implemented by the same or similar circuits with appropriate scaling of devices or currents. A skilled person could extend the technique to other circuits with similar triangular waveforms.

For the circuits above, the currents depend on design parameters such as switching frequency f and inductor value L. To enable the same circuitry, possibly an integrated circuit where tooling costs discourage redesign, for use at different switching frequencies or different inductors to suit different applications, these currents are preferably made programmable, for example by on-chip logic control, non-volatile memory including fuses, or possibly read-only memory or metal mask variants. By such methods, for each of the translinear circuits described above, the current mirrors in each circuit may be programmed, for example by adapting the size of one or more of the transistors in the current mirror in a similar way to that shown in FIG. 8. This allows the presetting circuitry to generate accurate error voltages for various values of inductor or operating frequency to suit different applications.

The present invention therefore provides a regulator circuit with an error amplifier for providing an error signal to a control input of a controller (e.g. a duty modulator). The regulator circuit may be operable in a plurality of modes, in which the error amplifier may be operational or non-operational. When the error amplifier is operational, it generates an appropriate error voltage on the control input based on the inputs to the error amplifier as normal. When the error amplifier is non-operational, it no longer drives any signal onto the control input. Instead presetting circuitry presets the control input to a correct, or approximately correct, value of the error signal. In this way, the control input is set at, or close to, the correct value of the error signal for stable operation of the regulator circuit and transients in the output voltage caused by a change of operational mode are reduced or removed completely. Moreover, no external resistor (and consequent IC pin and/or extra loading on the output) dedicated to this function is required as according to embodiments of the present invention the error signal is estimated independently of on-chip resistance by using just a general accurate absolute current reference $I_{EXT}$, already typically available in a regulator subsystem.

The switching regulator may be part of an integrated circuit, or a power management apparatus such as a power management integrated circuit (i.e. a PMIC). The embodiments of the invention may be useful for power management of any sub-systems of any form of electrical device, whether having a single power source or multiple power sources and whether portable or not. Allowing a rapid transition between supply modes, and reducing transient overshoot or undershoot when transitioning, reducing the supply margin required, both improve the achievable general efficiency of the system. The embodiments of the present invention are thus particularly applicable to portable devices such as: mobile computing devices such as laptops, netbooks, PDAs and the like; mobile communication devices such as radio telephones, cellular telephone, mobile email devices and the like; personal media players such as MP3 or other audio players, personal radios, video players; portable video game consoles and devices; personal navigation devices such as satellite navigators and GPS receivers, whether in-vehicle or hand-held or any other portable or battery operated device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

What is claimed is:

1. A regulator circuit comprising:
    an input for receiving an input voltage;
    an output stage, configured to switch between said input voltage and a reference voltage to generate an output voltage, in dependence on a modulated signal;
    a controller, configured to receive an error signal on a control input and to provide said modulated signal to said output stage; and
    an error amplifier, for providing said error signal to said controller in dependence on said output voltage;
    characterised by:
    presetting circuitry, configured to, when said error amplifier is inactive, estimate said error signal in dependence on at least said input voltage, and to preset said control input with said estimated error signal
    wherein said presetting circuitry is configured to estimate said error signal independently of any on-chip resistance associated with said presetting circuitry.

2. A regulator circuit as claimed in claim 1, wherein said regulator circuit is operable in one of at least a first mode and a second mode, wherein,
   in said first mode, said error amplifier is configured to provide said error signal to said control input, and
   in said second mode, said error amplifier is configured to not provide said error signal to said control input, and said presetting circuitry is configured to preset said control input with said estimated error signal.

3. A regulator circuit as claimed in claim 1, wherein said presetting circuitry is configured to estimate said error signal in dependence on said input voltage and on said output voltage.

4. A regulator circuit as claimed in claim 3, wherein said presetting circuitry is configured to estimate said error signal in dependence on a representation of the output voltage.

5. A regulator circuit as claimed in claim 4, wherein the representation of the output voltage is dependent on an output voltage select signal.

6. A regulator circuit as claimed in claim 1, wherein the presetting circuitry is programmable to estimate said error signal allowing for the values of one or more of: a switching frequency of said output stage, an inductor, a pedestal current, and an anticipated current in the output stage.

7. A regulator circuit as claimed in claim 1, wherein the presetting circuitry comprises a translinear circuit.

8. A regulator circuit as claimed in claim 7, wherein the translinear circuit generates a current with a component proportional to $(V_{IN}-\chi \cdot V_{OUT})^2/V_{IN}$, where $V_{IN}$ is the input voltage, $V_{OUT}$ is the output voltage and $\chi$ is a constant.

9. A regulator circuit as claimed in claim 1, wherein the presetting circuitry precharges a capacitor coupled to said control input.

10. A regulator circuit as claimed in claim 9, wherein said capacitor is coupled to said control input via a resistor.

11. A regulator circuit as claimed in claim 1, wherein the regulator circuit is a buck converter.

12. A regulator circuit as claimed in claim 1, wherein the regulator circuit is a boost converter.

13. A regulator circuit as claimed in claim 1, wherein the regulator circuit is a buck-boost converter.

14. A regulator circuit as claimed in claim 1, wherein the regulator circuit operates in valley control mode.

15. A regulator circuit as claimed in claim 1, wherein the regulator circuit operates in peak control mode.

16. A regulator circuit as claimed in claim 1, further comprising:
   a slope compensation circuit comprising:
      a first current source dependent on the input voltage; and
      a second current source dependent on the output voltage.

17. A regulator circuit as claimed in claim 16, wherein the second current source is dependent on a representation of the output voltage.

18. A regulator circuit as claimed in claim 16, wherein the first and second current sources are independent of any on-chip resistance.

19. A regulator circuit as claimed in claim 16, wherein the first current source comprises a second translinear circuit with at least one branch biased by a current source dependent on on-chip resistance and at least one branch biased by a current source independent of any on-chip resistance.

20. A regulator circuit as claimed in claim 1, wherein said modulated signal is a pulse-width modulated signal.

21. An integrated circuit comprising a regulator circuit as claimed in claim 1.

22. An electronic device comprising a regulator circuit as claimed in claim 1.

23. An electronic device as claimed in claim 22 wherein the device is one of: a portable computing device; a laptop computer; a personal data assistant; a personal media player; an mp3 player; a portable television; a mobile communications device; a mobile telephone; a navigation aid; a GPS device; a game console.

24. A method of operating a regulator circuit, the method comprising:
   generating a modulated signal in dependence on an error signal received at a control input;
   in dependence on said modulated signal, switching between an input voltage and a reference voltage to generate an output voltage; and
   in a first mode, providing said error signal to said control input in dependence on said output voltage;
   characterised by:
   in a second mode that is active when said error signal is not available, estimating by presetting circuitry said error signal in dependence on at least said input voltage; and
   presetting said control input with said estimated error signal;
   wherein said error signal is estimated independently of any on-chip resistance associated with said presetting circuitry.

25. A method as claimed in claim 24, further comprising:
   estimating said error signal in dependence on said input voltage and on said output voltage.

26. A method as claimed in claim 25, further comprising:
   estimating said error signal in dependence on a representation of the output voltage.

27. A method as claimed in claim 26, wherein the representation of the output voltage is dependent on an output voltage select signal.

28. A method as claimed in claim 24, wherein the step of generating a modulated signal comprises the sub-step of:
   comparing said error signal with a summed signal representing the sum of at least a representation of an output current and of a ramped current.

29. A regulator circuit comprising:
   an input for receiving an input voltage;
   an output stage, configured to switch between said input voltage and a reference voltage to generate an output voltage, in dependence on a modulated signal;
   a controller, configured to receive an error signal on a control input and to provide said modulated signal to said output stage; and
   an error amplifier, for providing said error signal to said controller in dependence on said output voltage;
   characterized by:
   presetting circuitry, configured to, when said error amplifier is inactive, estimate said error signal in dependence on at least said input voltage, and to preset said control input with said estimated error signal,
   wherein the controller is configured to compare said error signal with a summed signal representing the sum of at least a representation of an output current of the regulator circuit and of a ramped current.

30. A regulator circuit as claimed in claim 29, wherein said estimated error signal is an estimate of the value of the error signal at which said summed signal equals said error signal.

* * * * *